(12) United States Patent
Sugimura et al.

(10) Patent No.: US 10,638,113 B2
(45) Date of Patent: Apr. 28, 2020

(54) IMAGING SYSTEM, IMAGING DEVICE, METHOD OF IMAGING, AND STORAGE MEDIUM

(71) Applicant: NIKON CORPORATION, Tokyo (JP)

(72) Inventors: Takeaki Sugimura, Tokyo (JP); Yoshihiro Nakagawa, Tokyo (JP)

(73) Assignee: NIKON CORPORATION, Tokyo (JP)

(*) Notice: Subject to any disclaimer, the term of this patent is extended or adjusted under 35 U.S.C. 154(b) by 156 days.

(21) Appl. No.: 15/717,423

(22) Filed: Sep. 27, 2017

(65) Prior Publication Data

US 2018/0020207 A1  Jan. 18, 2018

Related U.S. Application Data

(63) Continuation of application No. PCT/JP2016/059907, filed on Mar. 28, 2016.

(30) Foreign Application Priority Data

Apr. 2, 2015 (JP) ................................. 2015-075564

(51) Int. Cl.
*H04N 13/239* (2018.01)
*G06K 9/00* (2006.01)
(Continued)

(52) U.S. Cl.
CPC ......... *H04N 13/239* (2018.05); *G01B 11/002* (2013.01); *G01B 11/245* (2013.01);
(Continued)

(58) Field of Classification Search
CPC combination set(s) only.
See application file for complete search history.

(56) References Cited

U.S. PATENT DOCUMENTS

| 6,664,531 B2* | 12/2003 | Gartner | G01B 11/245 250/208.1 |
| 2012/0038934 A1* | 2/2012 | Miyasaka | G01B 11/2513 356/610 |

(Continued)

FOREIGN PATENT DOCUMENTS

| JP | 2003-006618 A | 1/2003 |
| JP | 2005-284403 A | 10/2005 |
| JP | 2010-134546 A | 6/2010 |

OTHER PUBLICATIONS

Jun. 14, 2016 International Search Report issued in International Patent Application No. PCT/JP2016/059907.
(Continued)

*Primary Examiner* — Alexander Gee
(74) *Attorney, Agent, or Firm* — Oliff PLC

(57) ABSTRACT

An imaging system, including: a first body; a first imager that is provided in the first body and images an object; a first information calculator that is provided in the first body and calculates first model information including at least one of shape information and texture information of the object based on an imaging result of the first imager; a pattern setter that sets a reference pattern indicating at least a part of the first model information calculated by the first information calculator; a first projector that projects the reference pattern toward the object; a second body; a second imager that is provided in the second body and images the object onto which the reference pattern is projected; a second information calculator that is provided in the second body and calculates second model information including at least one of shape information and texture information of the object based on an imaging result of the second imager; and a pattern extractor that extracts the reference pattern projected by the first projector from the imaging result of the second imager.

27 Claims, 10 Drawing Sheets

(51) Int. Cl.

| | | |
|---|---|---|
| *G06K 9/20* | (2006.01) | |
| *H04N 5/232* | (2006.01) | |
| *H04N 5/33* | (2006.01) | |
| *H04N 13/296* | (2018.01) | |
| *H04N 13/254* | (2018.01) | |
| *G06T 7/521* | (2017.01) | |
| *H04N 5/247* | (2006.01) | |
| *G06T 7/60* | (2017.01) | |
| *G06T 7/40* | (2017.01) | |
| *G06K 9/46* | (2006.01) | |
| *G01B 11/25* | (2006.01) | |
| *G01B 11/00* | (2006.01) | |
| *G06T 7/73* | (2017.01) | |
| *G01B 11/245* | (2006.01) | |
| *H04N 5/225* | (2006.01) | |
| *G06T 7/593* | (2017.01) | |

(52) U.S. Cl.
CPC ...... *G01B 11/2513* (2013.01); *G06K 9/00201* (2013.01); *G06K 9/2036* (2013.01); *G06K 9/4604* (2013.01); *G06T 7/40* (2013.01); *G06T 7/521* (2017.01); *G06T 7/60* (2013.01); *G06T 7/74* (2017.01); *G06T 7/75* (2017.01); *H04N 5/232* (2013.01); *H04N 5/247* (2013.01); *H04N 5/33* (2013.01); *H04N 13/254* (2018.05); *H04N 13/296* (2018.05); *G06K 2209/401* (2013.01); *G06T 7/593* (2017.01); *G06T 2207/10012* (2013.01); *G06T 2207/30208* (2013.01); *H04N 5/2258* (2013.01)

(56) References Cited

U.S. PATENT DOCUMENTS

| | | | | |
|---|---|---|---|---|
| 2012/0162385 | A1* | 6/2012 | Park | H04N 13/254 348/47 |
| 2012/0268567 | A1* | 10/2012 | Nakazato | G01B 11/03 348/46 |
| 2014/0028805 | A1* | 1/2014 | Tohme | G01C 15/002 348/47 |
| 2014/0307085 | A1* | 10/2014 | Ohsawa | G01B 11/026 348/136 |

OTHER PUBLICATIONS

Jun. 14, 2016 Written Opinion issued in International Patent Application No. PCT/JP2016/059907.

Translation of Jun. 19, 2018 Office Action issued in Japanese Patent Application No. 2017-509976.

* cited by examiner

IMAGING SYSTEM, IMAGING DEVICE, METHOD OF IMAGING, AND STORAGE MEDIUM

CROSS REFERENCE TO RELATED APPLICATION

This is a Continuation of PCT Application No. PCT/JP2016/059907, filed on 28 Mar. 2016. The contents of the above-mentioned application are incorporated herein by reference.

FIELD OF THE INVENTION

The present invention relates to an imaging system, an imaging device, a method of imaging, and a storage medium.

BACKGROUND

A technique that acquires a three-dimensional shape of an object is developed (for example, see Patent Literature 1). To acquire the three-dimensional shape, for example, an object is detected with a plurality of fields of view, and a partial model obtained from a detection result with a first field of view and a partial model obtained from a detection result with a second field of view are integrated.

[Patent Literature 1] Japanese Unexamined Patent Application Publication No. 2010-134546

For example, when information indicating a correspondence between the first field of view and the second field of view is insufficient, it is difficult to associate information obtained with the first field of view and information obtained with the second field of view with each other with high precision.

SUMMARY

A first aspect of the present invention provides an imaging system, including: a first body; a first imager that is provided in the first body and images an object; a first information calculator that is provided in the first body and calculates first model information including at least one of shape information and texture information of the object based on an imaging result of the first imager; a pattern setter that sets a reference pattern indicating at least a part of the first model information calculated by the first information calculator; a first projector that projects the reference pattern toward the object; a second body; a second imager that is provided in the second body and images the object onto which the reference pattern is projected; a second information calculator that is provided in the second body and calculates second model information including at least one of shape information and texture information of the object based on an imaging result of the second imager; and a pattern extractor that extracts the reference pattern projected by the first projector from the imaging result of the second imager.

A second aspect of the present invention provides an imaging system, including: a first body; a first projector that is provided in the first body and projects a reference pattern indicating at least a part of first model information including at least one of shape information and texture information of an object toward the object; a second body; a second imager that is provided in the second body and images the object onto which the reference pattern is projected; an information calculator that calculates second model information including at least a part of shape information and texture information of the object based on an imaging result of the second imager; and a pattern extractor that extracts the reference pattern projected by the first projector from the imaging result of the second imager.

A third aspect of the present invention provides an imaging device, including: a body; an imager that is provided in the body and images an object and a reference pattern projected onto the object; a pattern extractor that extracts the reference pattern projected onto the object from an imaging result of the imager; and an information calculator that is provided in the body and uses the imaging result of the imager and the reference pattern extracted by the pattern extractor to calculate model information including at least one of shape information and texture information of the object.

A fourth aspect of the present invention provides an imaging device, including: a body; an imager that is provided in the body and images a feature part provided on a surface of an object; a pattern extractor that extracts the feature part of the object from an imaging result of the imager; and an information calculator that is provided in the body and uses the imaging result of the imager and the feature part to calculate model information including at least one of shape information and texture information of the object.

A fifth aspect of the present invention provides a method of imaging, including: imaging an object by a first imager provided in a first body; calculating first model information including at least one of shape information and texture information of the object based on an imaging result of the first imager by a first information calculator provided in the first body; projecting a reference pattern indicating at least a part of the first model information calculated by the first information calculator toward the object; imaging the object onto which the reference pattern is projected by a second imager provided in a second body; calculating second model information including at least one of shape information and texture information of the object based on an imaging result of the second imager by a second information calculator provided in the second body; and extracting the reference pattern projected by the first projector from the imaging result of the second imager.

A sixth aspect of the present invention provides a storage medium storing therein a program that causes a computer to execute: imaging a feature part provided on a surface of an object by an imager provided in a body; extracting the feature part of the object from an imaging result of the imager; and calculating model information including at least one of shape information and texture information of the object by using the imaging result of the imager and the feature part by an information calculator provided in the body.

DESCRIPTION OF EMBODIMENTS

First Embodiment

Figure 1:
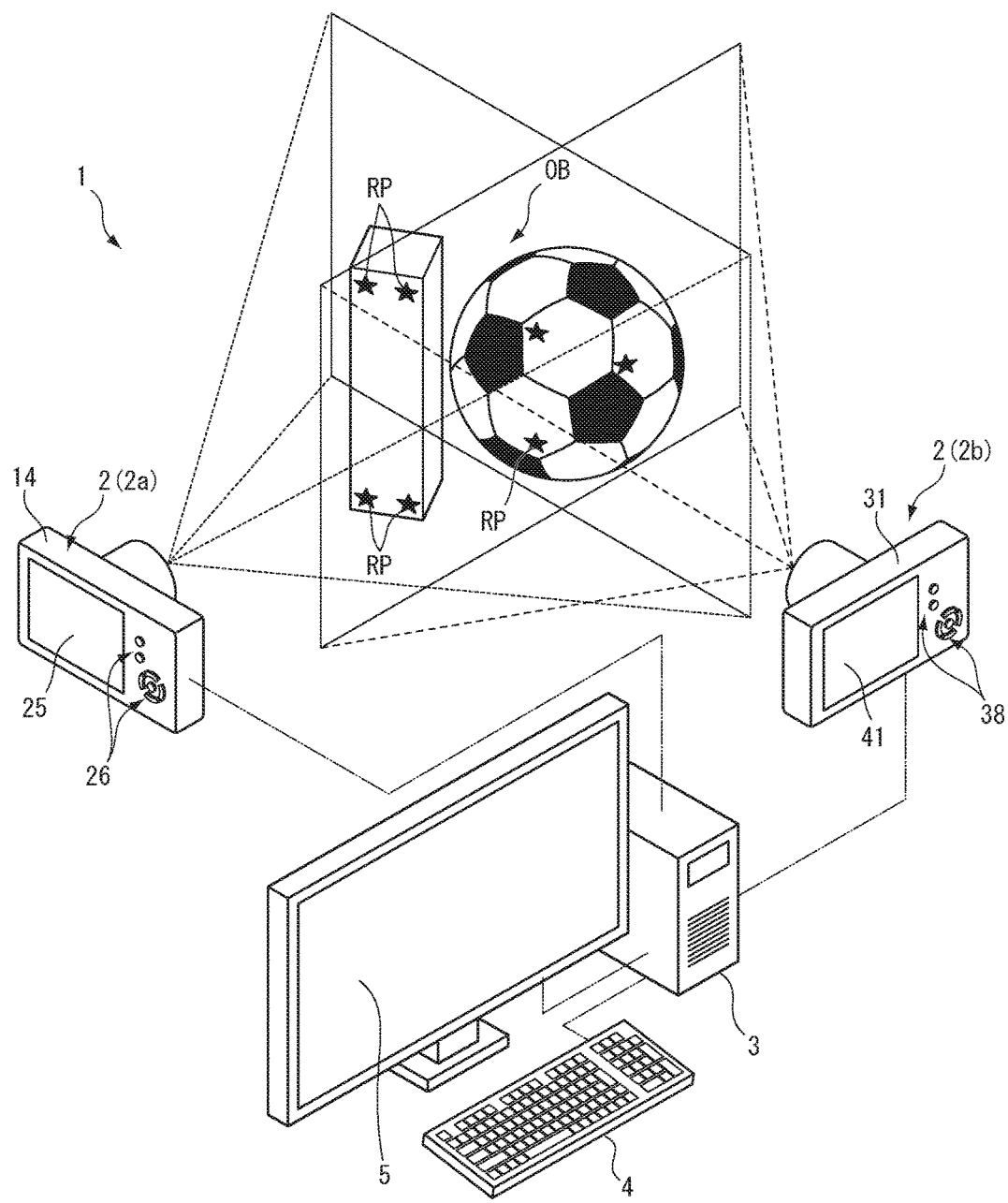
FIG. 1 is a diagram illustrating an imaging system according to a first embodiment.

A first embodiment is now described. FIG. 1 is a diagram illustrating an imaging system 1 according to the first embodiment. For example, the imaging system 1 includes a plurality of imaging devices 2, an information processing device 3, an input device 4, and a display device 5. For example, the imaging devices 2 include a first imaging device 2a and a second imaging device 2b.

The first imaging device 2a images, for example, an object OB illuminated with light from an illumination device, light from an interior lamp, or natural light to acquire data on a taken image (for example, visible light image or infrared light image) of the object OB. The first imaging device 2a detects a distance from the first imaging device 2a to each point on the surface of the object OB to acquire depth information on the object OB. For example, the depth information includes information in which the position of a point on the surface of the object OB is associated with the distance (depth) from the point to the first imaging device 2a (for example, distance information). Examples of the depth information include information indicating a distribution of the depths in an area including the object OB (for example, a depth map).

The first imaging device 2a uses the depth information to perform calculation processing on information about the object OB. The first imaging device 2a performs calculation processing to model at least a part of the object OB (modeling processing) and calculates model information (model data) including shape information or texture information. The model information includes, for example, at least one of shape information indicating a three-dimensional shape of the object OB and texture information indicating a pattern of the surface of the object OB. For another example, the model information includes at least one of three-dimensional coordinates of a plurality of respective points on the surface of the object OB, information related to the points, texture information of a surface defined by the three-dimensional coordinates of the points and the related information, image spatial information such as illumination conditions for the entire image and light source information, and polygon data as shape information.

For example, the object OB in FIG. 1 includes a prismatic member and a spherical ball having a sphere (for example, a soccer ball), and shape information thereof includes information on the surface of the prismatic member (for example, a plane) and information on the surface of the ball (for example, a sphere). Texture information of the object OB includes, for example, at least one piece of information of a character, a figure (for example, a black pentagon or a white hexagon), a pattern, information defining unevenness, a particular image, and a color (for example, a chromatic color or an achromatic color) on the surface of the ball.

For example, the first imaging device 2a calculates first model information on a part of the object OB that is within the field of view of the first imaging device 2a (a view field area, an area of field of view). Examples of this first model information include information on a model (hereinafter referred to as "first partial model") representing a part of a model representing the whole circumference of the object OB (hereinafter referred to as "whole circumference model"). For example, the whole circumference model is a model the surface of which is closed, whereas the first partial model is a model the surface of which is not closed. The first imaging device 2a is capable of supplying at least a part of information calculated through calculation processing (for example, the first model information) to an external device. For example, the first imaging device 2a supplies at least a part of the first model information to the information processing device 3.

The second imaging device 2b is arranged at a position different from that of the first imaging device 2a in an area from which the object OB can be imaged. Therefore, the second imaging device 2b detects the object OB from a viewpoint different from that of the first imaging device 2a. For example, the second imaging device 2b acquires information for use in the calculation of model information outside the field of view of the first imaging device 2a. For example, the second imaging device 2b acquires data on a taken image (for example, a visible light image or an infrared light image) of the object OB. For example, the second imaging device 2b detects a distance from the second imaging device 2b to each point on the surface of the object OB to acquire depth information of the object OB.

In the first embodiment, the first imaging device 2a projects a pattern including certain information, and the second imaging device 2b detects the pattern projected by the first imaging device 2a, whereby the certain information is acquired. For example, the certain information includes at least one of information used for the calculation of the model information, information used for model integration, information used for identifying one imaging device among the imaging devices 2 from another imaging device, and information indicating timing of operations of at least two imaging devices among the imaging devices 2.

For example, the first imaging device 2a projects a reference pattern RP indicating at least a part of the first model information toward the object OB. For example, the reference pattern RP includes a pattern (for example, a star mark in FIG. 1) indicating a feature part (hereinafter referred to as "feature point") in the first partial model of the object detected by the first imaging device 2a. The second imaging device 2b detects the reference pattern RP on the object OB to acquire information (for example, a position) of the feature point detected by the first imaging device 2a.

For example, the second imaging device 2b has the same configuration as the first imaging device 2a and calculates second model information of a part of the object OB that is within the field of view of the second imaging device 2b. The second model information is information on partial model (hereinafter referred to as "second partial model") representing a part of the whole circumference model. For example, a part of the second model information overlaps with the first partial model, and another part thereof does not overlap with the first partial model.

The second imaging device 2b detects the reference pattern projected in an overlapping part of the first partial model and the second partial model. For example, when the detected reference pattern is used, information indicating a correspondence between the feature point of the object OB detected by the first imaging device 2a and the second partial model is obtained. For example, this information may be used as information indicating a correspondence between a field of view (for example, a viewpoint, a line of sight, and an angle of view) of the first imaging device 2a and a field of view (for example, a viewpoint, a line of sight, and an angle of view) of the second imaging device 2b.

For example, the second imaging device 2b uses the detected reference pattern to calculate the second model information. The second imaging device 2b is capable of supplying at least a part of information calculated through calculation processing (for example, the second model information) to an external device. For example, the second imaging device 2b supplies at least a part of the second model information to the information processing device 3.

The information processing device 3 includes, for example, a computer system. The information processing device 3 is communicably connected to the first imaging device 2a in a wired or wireless manner. For example, the information processing device 3 may be connected to the first imaging device 2a via a communication cable or may be connected to the first imaging device 2a via the Internet line. The information processing device 3 may be communicable with the first imaging device 2a via short-range communication means using radio waves, infrared rays, or the like. The information processing device 3 is communicably connected to the second imaging device 2b. The mode of communication between the information processing device 3 and the second imaging device 2b may be the same as or different from the mode of communication between the information processing device 3 and the first imaging device 2a. The first imaging device 2a is communicably connected to the second imaging device 2b. The mode of communication between first imaging device 2a and the second imaging device 2b may be the same as or different from the mode of communication between the information processing device 3 and the first imaging device 2a.

The information processing device 3 acquires information from the first imaging device 2a through communication with the first imaging device 2a. The information processing device 3 acquires information from the second imaging device 2b through communication with the second imaging device 2b. The information processing device 3 uses the information acquired from the first imaging device 2a and the information acquired from the second imaging device 2b to perform information processing. For example, the information processing device 3 performs model integration processing to integrate the first partial model by the first imaging device 2a and the second partial model by the second imaging device 2b in this information processing.

For example, the information processing device 3 uses information on the integrated model to execute image processing (for example, rendering processing, recognition processing using model information) as information processing. For example, on the basis of setting information on a viewpoint (an imaging direction) input to the input device 4 by a user, the information processing device 3 calculates data on an estimated image of the object OB that is viewed from this viewpoint.

The input device 4 includes, for example, at least one of a keyboard, a mouse, a touch panel, a sensor such as an acceleration sensor, a voice input machine, and a touch pen, and is connected to the information processing device 3. For example, the input device 4 receives an input of information from a user, and supplies the input information to the information processing device 3. The display device 5 includes, for example, a liquid crystal display or a touch panel display, and is connected to the information processing device 3. For example, the display device 5 displays an image (for example, an estimated image by the rendering processing) by using image data supplied from the information processing device 3.

For example, at least one imaging device (for example, the first imaging device 2a) among the imaging devices 2 may be a portable information terminal, a stationary camera fixed at a certain position, or a camera the field of view of which can be manually or automatically changed. The number of imaging devices included in the imaging devices 2 is freely set and may be three or more. For example, the imaging system 1 may include a moving device that moves at least one imaging device among the imaging devices 2. This moving device may move the imaging device to change the field of view of this imaging device. A controller that controls this moving device may be provided in the imaging system 1 or may be provided in, for example, an imaging device or the information processing device 3. The controller that controls this moving device may be provided in a device outside the imaging system 1.

At least one imaging device (for example, the first imaging device 2a) among the imaging devices 2 may be capable of outputting at least a part of the model information to a digital device that is capable of inputting and outputting digital information such as barcodes and two-dimensional codes. This digital device may be capable of displaying or printing digital information including at least a part of the model information on a display or media such as paper. A reader device including a reader (for example, an optical reader) capable of reading the displayed or printed digital information can input the digital information to a storage area in its own device via the reader. The reader device may further include a rendering processor described later. The imaging system 1 may include at least a part of the digital device and the reader device. For example, the first imaging device 2a may include at least a part of the digital device and the reader device.

Figure 2:
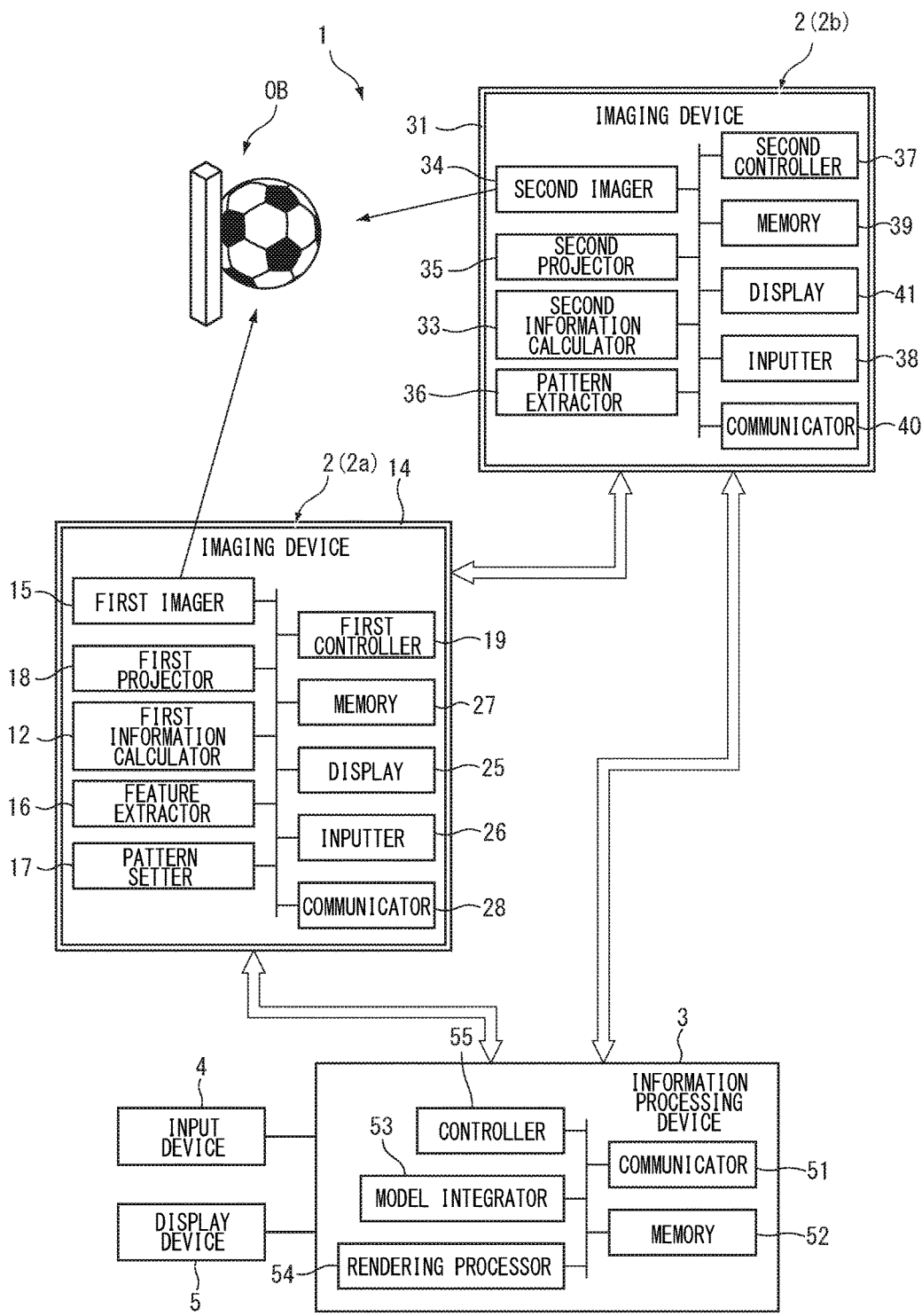
FIG. 2 is a block diagram illustrating the imaging system according to the first embodiment.

Next, each unit in the imaging devices 2 and each unit in the information processing device 3 are described. FIG. 2 is a block diagram illustrating the imaging system 1 according to the first embodiment. The first imaging device 2a includes a first information calculator 12, a first body 14, a first imager 15, a feature extractor 16, a pattern setter 17, a first projector 18, and a first controller 19.

First, an example of each unit in the first imaging device 2a is described. The first body 14 is, for example, a camera body, a case, or a housing. For example, the first body 14 may be supported by a support member such as a tripod, a ceiling-hung fixture, or a stage. This support member may be a part of the first body 14.

The first imager 15 is provided in the first body 14. The first imager 15 images the object. For example, the first projector 18 is provided in the first body 14. The first projector 18 is capable of projecting a pattern toward the object OB. For example, the first imager 15 and the first projector 18 are projector cameras. The first imaging device 2a is capable of detecting the pattern projected onto the object OB from the first projector 18 by the first imager 15 and detecting a distance from the first imaging device 2a to each point on the surface of the object OB.

Figure 3:
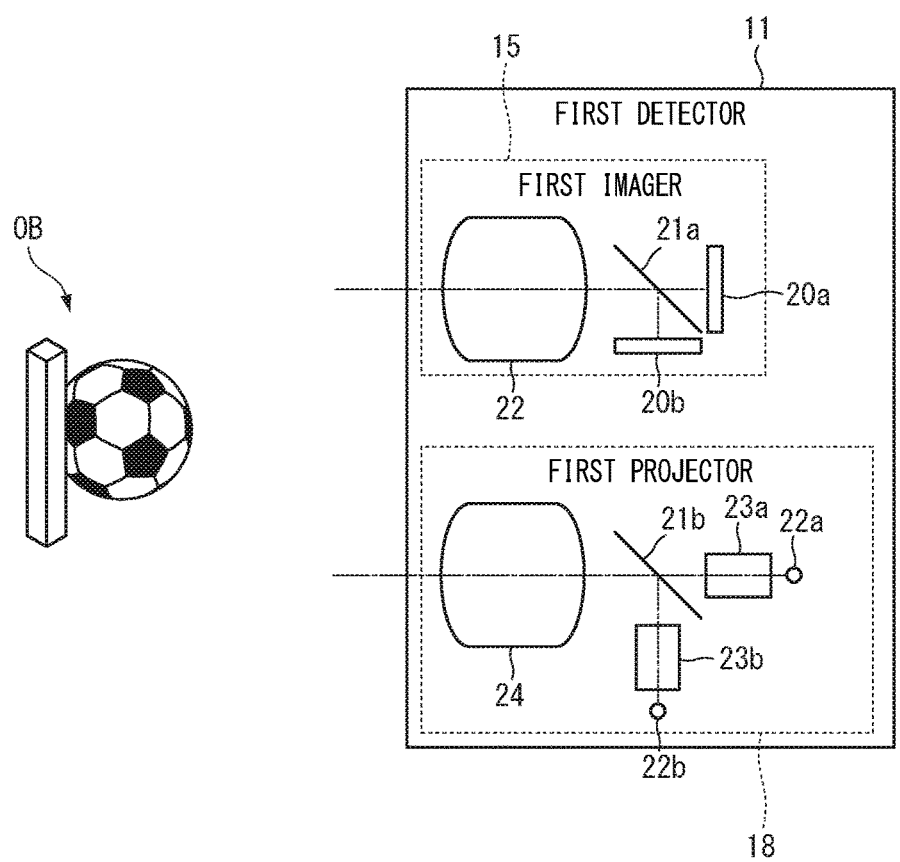
FIG. 3 is a diagram illustrating an example of a first imager and a first projector according to the first embodiment.

FIG. 3 is a diagram illustrating an example of the first imager 15 and the first projector 18. In the first embodiment, the first imaging device 2a includes a first detector 11. The first detector 11 includes the first imager 15 and is capable of detecting a distance from the first imaging device 2a to an object (for example, the object OB). For example, the first detector 11 includes the first imager 15 and the first projector 18. The first detector 11 images the object OB by the first imager 15 while irradiating the object OB with light (for example, patterned light, structured light, or a texture) having certain intensity distribution from the first projector 18. The first imaging device 2a uses the intensity distribution of light on the object OB in a taken image by the first imager 15 to detect the distance between the object OB and the first imaging device 2a. For example, to detect the distance from the detector itself (the first detector 11) to the object OB for each pixel of a taken image taken by the first imager 15, the first detector 11 may determine a relative blurring amount from a plurality of taken images having different focal distances for the same object OB and execute depth from defocus (DFD) processing using correlation between an image blurring amount and the distance to detect the distance.

For example, the first imager 15 is capable of taking a visible light image and an infrared light image. The first imager 15 includes, for example, an image sensor 20a, an image sensor 20b, a dichroic mirror 21, and an image-forming optical system 22 (an imaging optical system). The image sensor 20a and the image sensor 20b are each an image sensor such as a CMOS image sensor or a CCD image sensor. For example, the image sensor has a structure in which a plurality of pixels are arranged in a two-dimensional manner and photoelectric conversion elements such as photodiodes are arranged at the respective pixels.

For example, the image sensor 20a has sensitivity to a wavelength band of visible light (for example, 380 nm or more and 750 nm or less). The imaging result of the image sensor 20a includes, for example, information on gray-scale values of each color of each pixel (for example, RGB data). For example, the image sensor 20a outputs the imaging result (a detection result) in a full-color image data format. A full-color image is, for example, an image in which each of red (R), green (G), and blue (B) of each pixel is represented by a gray-scale value (for example, 256 levels). For example, the image sensor 20b has sensitivity to a wavelength band of infrared light. For example, the image sensor 20a outputs the imaging result (a detection result) in a gray image data format. The gray image is, for example, an image in which the brightness of each pixel is represented by a gray-scale value (for example, 256 levels).

The image-forming optical system 22 includes, for example, a plurality of lenses, and forms an image of an object surface (for example, object OB). For example, the image-forming optical system 22 is held in a lens barrel, and is mounted on the first body 14 together with the lens barrel. The image-forming optical system 22 and the lens barrel are, for example, interchangeable lenses, and are detachable from the first body 14. The lens barrel may be a part of the first body 14, and may be undetachable from the first body 14.

The dichroic mirror 21 has characteristics of passing light (for example, visible light) with a wavelength band to which the image sensor 20a has sensitivity and reflecting light (for example, infrared light) with a wavelength band to which the image sensor 20b has sensitivity. Visible light in light from the image-forming optical system 22 passes through the dichroic mirror 21 to enter the image sensor 20a. The image sensor 20a detects this visible light to take a visible light image. Infrared light in the light from the image-forming optical system 22 is reflected off the dichroic mirror 21 to enter the image sensor 20b. The image sensor 20b detects this infrared light to take an infrared light image.

In the first imager 15, the image-forming optical system 22 functions as both a first optical system that forms the visible light image and a second optical system that forms the infrared light image; this second optical system may be provided separate from the first optical system. The first imager 15 may acquire one of the visible light image and the infrared image and does not necessarily need to acquire the other. For example, the first imager 15 may include the image sensor 20a, which acquires the visible light image, and does not necessarily need to include the image sensor 20b, which acquires the infrared light image.

For example, the first projector 18 is capable of projecting a visible light image and an infrared light image. For example, the first projector 18 includes a first light source 22a, a first optical engine 23a, a second light source 22b, a second optical engine 23b, a dichroic mirror 21b, and a projection optical system 24. The first light source 22a emits light (for example, visible light) with a wavelength band to which the image sensor 20a has sensitivity. The first optical engine 23a forms a visible light image (a pattern) through the light from the first light source 22a. The second light source 22b emits light (for example, infrared light) with a wavelength band to which the image sensor 20b has sensitivity. The second optical engine 23b forms an infrared light image (a pattern) through the light from the second light source 22b. The projection optical system 24 is capable of projecting the image formed by the first optical engine 23a and the image formed by the second optical engine 23b. The dichroic mirror 21b is arranged at an optical path in between the first optical engine 23a and the projection optical system 24. The dichroic mirror 21b has characteristics of passing the light from the first light source 22a and reflecting the light from the second light source 22b. For example, the first optical engine 23a has a digital micromirror device (for example, a DMD) and a reflective mirror or a lens to be capable of generating the pattern. For example, the second optical engine 23b has a digital micromirror device (for example, a DMD) and a reflective mirror or a lens to be capable of generating the pattern.

The visible light emitted from the first optical engine 23a passes through the dichroic mirror 21 to be applied toward the object OB via the projection optical system 24. With this application, the first projector 18 projects the pattern caused by visible light (the visible light image) toward the object OB. The light emitted from the second optical engine 23b (for example, infrared light) is reflected off the dichroic mirror 21b to be applied toward the object OB via the projection optical system 24. With this application, the first projector 18 projects the pattern caused by infrared light (the infrared light image) toward the object OB. For example, the first projector 18 is also capable of drawing the pattern on the surface of the object OB through optical scanning.

When the first projector 18 projects the visible light pattern, the first imager 15 images the object OB onto which the visible light pattern is projected by the image sensor 20a. When the first projector 18 projects the infrared light pattern, the first imager 15 images the object OB onto which the infrared light pattern is projected by the image sensor 20b. For example, the first imaging device 2a can detect the distance from the first imaging device 2a to each point on the surface of the object OB by detecting the pattern projected onto the object OB.

For example, when the first imaging device 2a detects the distance to the object OB, the first projector 18 projects a first distance measuring pattern. For example, the first distance measuring pattern is set as a grid pattern including grid lines parallel to a first direction and a grid lines parallel to a second direction different from the first direction. In this case, for example, by detecting, at each point on the surface of the object OB, to how many pixels the spacing of the grid lines around the point corresponds on the taken image by the first imager 15, a distance between this point and the first imaging device 2a can be calculated. By detecting the inclination and/or curvature of the grid lines in the taken image, the inclination and/or curvature of the surface of the object OB can be detected.

For example, the first distance measuring pattern is set as a dot pattern including a plurality of dots. In this case, for example, by detecting, at each point on the surface of the object OB, to how many pixels the size of a spot forming the dot corresponds on the taken image by the first imager 15, a distance between this point and the first imaging device 2a can be calculated. By detecting the distortion of the dot, the inclination and/or curvature of the surface of the object OB can be detected.

The first imager 15 can perform imaging concurrently with the pattern projection by the first projector 18. For example, the first imager 15 may acquire the infrared light image by the image sensor 20b while acquiring the visible light image by the image sensor 20a in a period during which the pattern caused by infrared light is projected from the first projector 18. The first imager 15 may perform imaging in a period that does not overlap with the pattern projection by the first projector 18. For example, the first imager 15 may acquire the visible light image by the image sensor 20a in a period during which the infrared light pattern is not projected from the first projector 18.

The first projector 18 is capable of projecting the visible light image and the infrared light image; only one of the visible light image and the infrared light image may be projected. For example, the first projector 18 may project the visible light image and does not necessarily need to project the infrared light image. In this case, the first projector 18 does not necessarily need to include the second light source 22b, the second optical engine 23b, and the dichroic mirror 21b. When the first projector 18 does not project the infrared light image, the first imager 15 does not necessarily need to take the infrared light image and does not necessarily need to include the dichroic mirror 21 and the image sensor 20b. For example, the first projector 18 may include a scanning projector. For example, the first projector 18 may deflect light from a laser light source or the like by a scanning mirror and scan the object OB with this light to draw (display) a pattern on the object OB.

The first imaging device 2a may detect the distance from the first imaging device 2a to each point on the surface of the object OB by a technique other than the projector camera. For example, the first detector 11 may include a time of flight (ToF) sensor and detect the distance by ToF. For example, the first detector 11 may include a stereo camera and detect the distance between the object OB and the first imaging device 2a by using detection results obtained by detecting the object OB with a plurality of fields of view as parallax images.

When the first detector 11 detects the distance to the object OB without projecting any pattern onto the object OB, the first projector 18 may be provided separate from the first detector 11. For example, the first projector 18 may be a unit to be externally connected to the first body 14 or arranged at a position separate from the first body 14.

Referring back to FIG. 2, the first information calculator 12 includes, for example, a digital signal processor (DSP).

The first information calculator 12 uses the detection result of the first detector 11 to calculate at least one of shape information and texture information of the object OB. As the shape information, the first information calculator 12 calculates coordinates of a plurality of points (for example, referred to as "point group data") on the surface of the object OB and surface information including link information between the points. Examples of the surface information include polygon data, vector data, and draw data. The link information includes, for example, information that associates points on both ends of a line corresponding to a ridge line (for example, an edge) of the object OB with each other and information that associates a plurality of lines corresponding to the contour of a surface of the object OB with each other.

First, the first information calculator 12 uses the detection result (for example, the depth information) of the first detector 11 to calculate the point group data (point group data processing). For example, the first information calculator 12 calculates the point group data through perspective transformation from a distance image indicated by the depth information to a planar image.

For example, the first information calculator 12 estimates a surface between a point selected from among the points included in the point group data and a point in the vicinity thereof and transforms the point group data into polygon data having plane information between points (surface processing, surface modeling). For example, the first information calculator 12 transforms the point group data into polygon data by an algorithm using the least-square method. For example, an algorithm published in a point group processing library may be applied as this algorithm.

Next, the first information calculator 12 calculates texture information by, for example, inverse rendering. The texture information includes, for example, information on at least one item of pattern information representing a pattern of the surface of the object OB, light source information on light applied to the object OB, and optical characteristics information representing optical characteristics (for example, reflectivity and scattering rate) of the surface of the object OB. The light source information includes, for example, information on at least one item of the position of a light source, the direction of light applied from the light source to the object, the wavelength of light applied from the light source, and the type of the light source.

For example, the first information calculator 12 calculates the light source information by using a model that assumes Lambertian reflectance or a model including Albedo estimation. For example, the first information calculator 12 estimates, among pixel values of respective pixels in an image taken by the first imager 15, a component derived from light diffused by the object OB and a component normally reflected by the object OB. For example, the first information calculator 12 uses the result of estimating the component normally reflected by the object OB and the shape information to calculate the direction in which light enters the object OB from the light source. For example, the first information calculator 12 uses the calculated light source information and shape information to estimate reflection characteristics of the object OB and calculates the optical characteristics information including the estimation result of the reflection characteristics. For example, the first information calculator 12 uses the calculated light source information and optical characteristics information to remove the influence of illumination light from visible light image data and calculates pattern information.

The feature extractor 16 extracts a feature point (for example, a feature point or a singular point) that can be identified from other parts of the first model information calculated by the first information calculator 12. For example, in the object OB, its edge or ridge line may include straight line parts. In this case, a point of intersection of a straight line part of the edge and another straight line part of the edge can be identified from the other parts and, for example, can be determined to be a point corresponding to a corner of a surface surrounded by this edge. When a plurality of corners on an edge are detected, the position of a certain division point (for example, a midpoint) between corners can be calculated from the coordinates of the two corners and is capable being identified from the other parts. For example, when the edge or the ridge line includes a curve part, a point at which the slope of its tangential line changes by a certain threshold or more can be identified from the other parts by calculating a slope at each point. For example, the feature extractor 16 extracts a plurality of feature points from the first model information in accordance with various kinds of algorithms.

Feature point data indicating a feature amount at a feature point extracted from at least one of shape information and texture information of an object may be contained in the first model information. For example, the feature extractor 16 may be a part of the first information calculator 12, and the feature extractor 16 may calculate first feature point data indicating the feature amount at the feature point as a part of the processing that the first information calculator 12 calculates the first model information.

The pattern setter 17 sets a reference pattern indicating at least a part of the first model information calculated by the first information calculator 12. The reference pattern is projected onto the whole or a part of the object OB by the first projector 18 and, for example, is detected by the second imaging device 2b to be used to convey information to the second imaging device 2b. For example, the reference pattern is projected onto the object OB by the first projector 18 to be used to display a part (hereinafter referred to as "reference part") of the first partial model provided in the first model information on the object OB.

Figure 4:
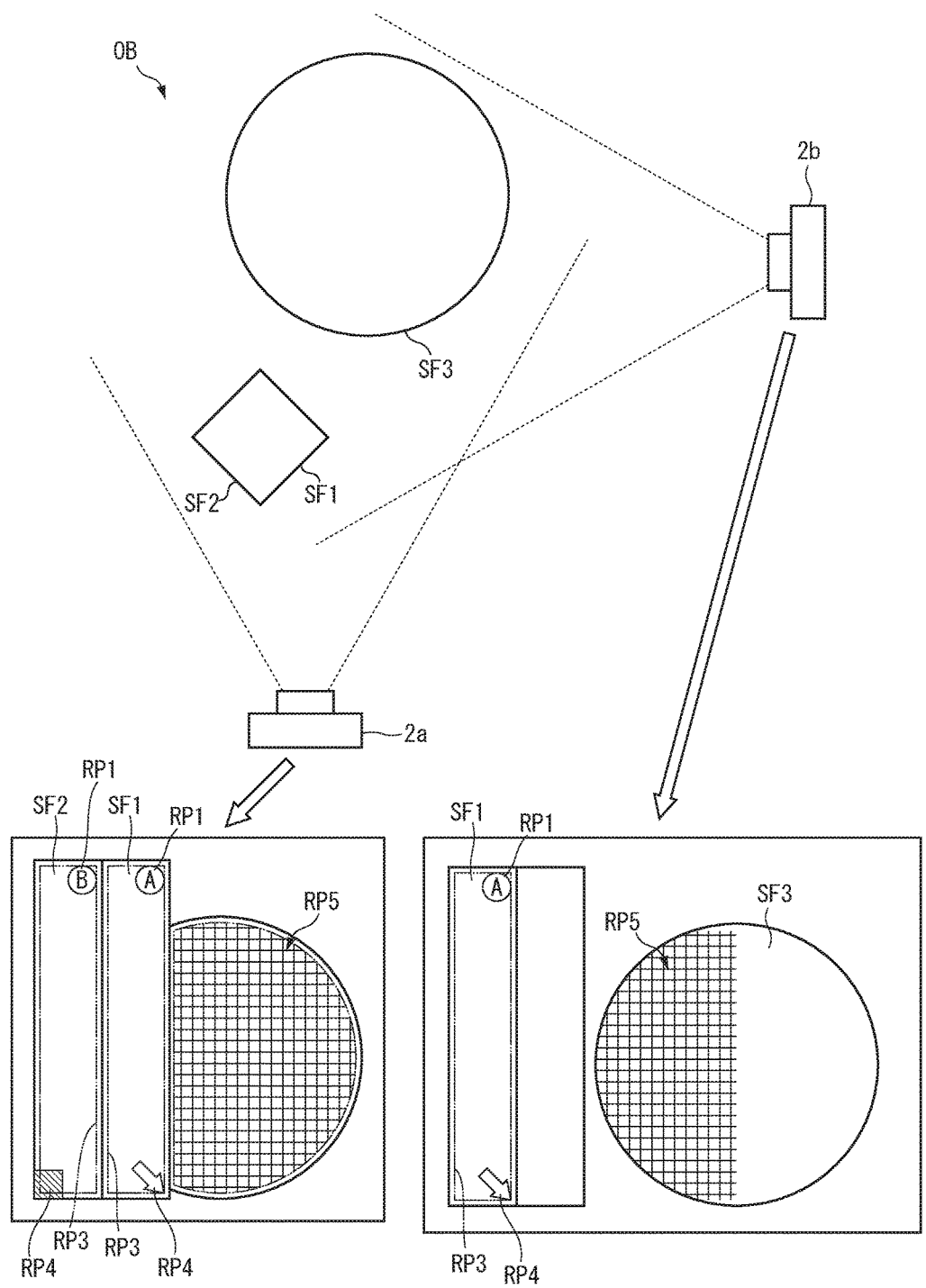
FIG. 4 is a diagram illustrating an example of a reference pattern according to the first embodiment.

FIG. 4 is a diagram illustrating an example of the reference pattern. For example, the pattern setter 17 may set a pattern that displays a code RP1 (for example, "A") in a part in which a surface SF1 (for example, a plane) is defined as surface information of the object OB as the reference pattern. When the code RP1 of the object OB onto which this reference pattern is projected is detected by the second imaging device 2b, for example, information indicating a correspondence (for example, a positional relation) between a surface RP1 in a detection result of the first imaging device 2a and a surface RP1 in a detection result of the second imaging device 2b is obtained. For example, the reference pattern is used for indicating which part the reference part is in the object OB in real space. In this case, for example, by detecting the object OB onto which the reference pattern is projected by the second imaging device 2b, to which position the reference part corresponds in the second partial model provided in the second model information can be detected.

For example, the pattern setter 17 may set a pattern that displays a code RP2 (for example, "B") in a part in which another surface SF2 (for example, a plane) than the surface SF1 is defined as the surface information of the object OB as the reference pattern. When the code RP2 of the object OB onto which this reference pattern is projected is not detected by the second imaging device 2b, the surface SF2 is revealed to be present within the field of view of the first imaging device 2a and outside the field of view of the second imaging device 2b.

The pattern setter 17 may set a pattern that displays a code RP3 (for example, a line) in a part defined as an edge or a ridge line of a surface defined as the surface information of the object OB as the reference pattern. The pattern setter 17 may set a pattern that displays a code RP4 (for example, a figure such as a rectangle or an arrow) in a part in which a corner (for example, an apex) of a surface is defined as the surface information of the object OB as the reference pattern.

For example, the pattern setter 17 may set a pattern that displays a code SF5 (for example, a mesh or a grid) in a part in which a surface SF3 (for example, a curved surface) is defined as the surface information of the object OB as the reference pattern. An area in which the code RP5 is detected by the second imaging device 2b of the object OB onto which this reference pattern is projected is revealed to be, for example, an area that is present within the field of view of the first imaging device 2a and within the field of view of the second imaging device 2b of the surface SF3. For example, this area corresponds to the overlapping part of the first partial mode and the second partial model.

For example, the reference pattern can be used for comparing the first partial model provided in the first model information and the object OB in real space. In this case, for example, by detecting deviation between the reference part projected onto the object OB and the object OB, the accuracy of the first model information can be evaluated. For example, the reference pattern can be used as information (a signal) indicating the operation timing of the first imaging device 2a. For example, the pattern setter 17 can set a pattern that encodes information (for example, time synchronization information) indicating timing at which the first imaging device 2a executes certain processing as a part of the reference pattern. The second imaging device 2b detects and decodes this pattern to acquire the information indicating the timing.

Illustrated in, for example, FIG. 4, the pattern setter 17 sets a pattern that indicates the reference part in a manner identifiable from the other parts as the reference pattern. For example, when the first information calculator 12 has calculated shape information, the pattern setter 17 sets the reference pattern to a pattern indicating at least a part of the shape information. For example, when the first information calculator 12 has calculated texture information, the pattern setter 17 sets, for example, the reference pattern to a pattern indicating at least a part of the texture information. For example, when the first information calculator 12 has calculated the shape information and the texture information, the pattern setter 17 sets the reference pattern to a pattern indicating one or both of at least a part of the shape information and at least a part of the texture information.

For example, the pattern setter 17 sets the reference pattern to a pattern associated with information on the feature point extracted by the feature extractor 16. In this case, for example, the reference part includes the feature point (for example, a corner, an edge, a ridge line, a protrusion, or a recess) extracted by the feature extractor 16. For example, the pattern setter 17 sets the reference pattern to a pattern associated with the surface information calculated by the first information calculator 12. In this case, for example, the reference part includes a part corresponding to a point (for example, a corner), a line (for example, an edge or a ridge line), or a surface defined in the surface information.

For example, the pattern setter 17 sets the reference pattern to a pattern the light intensity distribution of which spatially changes. For example, the pattern setter 17 sets the reference pattern to a pattern including a code indicating the reference part. This code may include one of or two or more of a figure (for example, a line, an arrow, a polygon, or a circular shape), a character (for example, a number, an alphabet, or a symbol), a two-dimensional or three-dimensional barcode, and a texture such as a mesh or a grid. For example, the pattern setter 17 may set a pattern the light intensity distribution of which temporally changes as the reference pattern. For example, the pattern setter 17 may indicate the reference part with a blinking pattern or the reference part with color (for example, a plurality of colors) to make the reference part distinguishable from the other parts.

The pattern setter 17 may set a pattern associated with identification information (for example, a number, a code, or an ID) that distinguishes one imaging device (for example, the first imaging device 2a) among the imaging devices 2 from another imaging device (for example, the second imaging device 2b) as the reference pattern. For example, when the code that identifies the first imaging device 2a among the imaging devices 2 is "1", the pattern setter 17 may set a pattern including "1" as the reference pattern. For example, when the second imaging device 2b has detected this reference pattern, the second imaging device 2b can identify that the device that has set this reference pattern is the first imaging device 2a. For example, the second imaging device 2b can identify that the device that has projected this reference pattern is the first imaging device 2a.

For example, the pattern setter 17 generates image data indicating the reference pattern. For example, the type (for example, a figure or a character) of the code included in the reference pattern is stored in the memory (described below) in association with the type (for example, a corner, an edge, or a surface) of the reference part. For example, it is defined in advance that when the type of the code is an alphabet, the reference part corresponding to this code is a surface. For example, the pattern setter 17 reads the type of the pattern corresponding to the type of the reference part from the memory 27 and arranges the code of this type at a position on an image corresponding to the position of the reference part to generate the image data indicating the reference pattern (hereinafter referred to as "reference image data"). For example, the pattern setter 17 stores the generated reference image data in the memory 27.

For example, the pattern setter 17 generates collation data that associates the code included in the reference pattern and the reference part indicated by this code with each other. For example, when a first code is assigned to a first feature point of the first partial model, the pattern setter 17 associates position information of the first feature point in the first partial model and the type of the first code with each other to generate the collation data. For example, the pattern setter 17 stores the collation data in the memory 27.

The first imaging device 2a according to the first embodiment further includes a display 25, an inputter 26, a memory 27, and a communicator 28. The display 25 (see FIG. 1) is, for example, a liquid crystal display or a touch panel display provided to the first body 14. For example, the display 25 displays at least a part of the detection result of the first detector 11 (for example, the visible light image by the first imager 15), calculation results of the first information calculator 12 (for example, the depth map), and various kinds of setting information.

The inputter 26 is, for example, an operation button provided to the first body 14, a touch panel provided to the display 25, a voice input machine that recognizes voice of a user, or a release button. For example, the inputter 26 detects an operation by a user and receives an input of information from the user. The inputter 26 transmits the input information to the first controller 19.

The memory 27 is, for example, a non-volatile memory such as a USB memory or a memory card and stores therein various kinds of information. The memory 27 may include a storage device incorporated in the first imaging device 2a and may include a port to which a storage device releasable from the first imaging device 2a is capable of being connected. For example, the first information calculator 12 generates model information obtained by adding header information (for example, identification information such as a number and a code) to information including at least one of shape information and texture information. The communicator 28 transmits the model information. For example, the memory 27 stores therein the model information for each item. For example, the memory 27 stores therein information on each item of shape information, texture information, light source information, optical characteristics information on the object OB, and pattern information in individual data tables.

The header information may include at least one of the identification information, the position of the first imaging device 2a (position information), imaging timing by the first imager 15, imaging time by the first imager 15, the optical characteristics information of the object OB, and imaging environmental information (for example, light source information or irradiation conditions for the object OB and the like). For example, the first information calculator 12 is capable of generating model information having the header information on the basis of a certain data format and transmitting the model information by the communicator 28.

For example, the communicator 28 includes at least one of an I/O port such as a USB port and a communication device that performs wireless communication by radio waves or infrared rays. The communicator 28 is controlled by the first controller 19 to read information stored in the memory 27 and transmit the read information to an external device. For example, the communicator 28 transmits at least a part of the calculation results of the first information calculator 12 (for example, the model information) to the information processing device 3. For example, the communicator 28 receives information including an instruction from an external device. The communicator 28 is capable of storing the received information in the memory 27 and supplying the received information to the first controller 19. When the first imaging device 2a includes the above-mentioned digital device, the communicator 28 may transmit at least a part of the model information to the digital device. The digital device may generate digital information on the basis of the received model information and output this digital information to media such as paper.

The first controller 19 is held by the first body 14. For example, the first controller 19 controls each unit in the first imaging device 2a through an instruction (a control signal) from a user or an external device (for example, the information processing device 3). For example, the first controller 19 causes the first detector 11 to execute the above-mentioned detection processing. For example, this detection processing includes imaging processing by the first imager 15 and distance detection processing by the first detector 11. For example, in the distance detection processing, the first controller 19 controls the first projector 18 to cause the first projector 18 to project the first distance measuring pattern onto the object OB. The first controller 19 controls the first imager 15 to cause the first imager 15 to image the object OB onto which the first distance measuring pattern is projected. For example, the first controller 19 stores at least a part of the taken image by the first imager 15 in the memory 27.

For example, the first controller 19 controls the first information calculator 12 to calculate the first model information on the basis of the taken image obtained by imaging the object OB onto which the first distance measuring pattern is projected by the first imager 15. For example, the first controller 19 stores at least a part of the first model information calculated by the first information calculator 12 in the memory 27. For example, the first controller 19 controls the feature extractor 16 to execute feature extraction processing to extract the feature point from the first model information.

For example, after the first model information has been calculated or after the feature extraction processing has been executed, the first controller 19 controls the pattern setter 17 to execute reference pattern setting processing. For example, the first controller 19 causes the pattern setter 17 to execute processing to generate the reference image data. For example, the first controller 19 stores the reference image data in the memory 27. The first controller 19 supplies information indicating a projection condition for the first projector 18 to the second imaging device 2*b*. For example, the projection condition for the first projector 18 includes timing of projection by the first projector 18. The projection condition for the first projector 18 may include information on the pattern to be projected by the first projector 18 (for example, the reference image data). For example, the first controller 19 controls the first projector 18 to cause the first projector 18 to project the reference pattern on the basis of the reference image data.

For example, the first controller 19 causes the display 25 to display an image indicating at least a part of the information stored in the memory 27. The first controller 19 controls the communicator 28 to execute transmission of information and reception of information via the communicator 28.

Next, an example of each unit in the second imaging device 2*b* arranged at a position different from the first imaging device 2*a* in the area from which the object OB can be imaged is described. The second imaging device 2*b* includes a second body 31, a second information calculator 33, a second imager 34, a second projector 35, a pattern extractor 36, and a second controller 37. The second body 31 is, for example, a camera body, a case, or a housing. The second body 31 is arranged at a position separate from the first body 14.

The second imager 34 is provided in the second body 31. The second imager 34 images the object OB. For example, the second projector 35 is provided in the second body 31. The second projector 35 is capable of projecting a pattern toward the object OB. For example, the second imager 34 and the second projector 35 are projector cameras. The second imaging device 2*b* is capable of detecting a pattern (a second distance measuring pattern) projected onto the object OB from the second projector 35 by the second imager 34 and detecting a distance from the second imaging device 2*b* to each point on the surface of the object OB. For example, a second detector including the second imager 34 and the second projector 35 may have the same configuration as the first detector 11 illustrated in FIG. 3.

The second imager 34 images the object OB onto which the reference pattern is projected by the first projector 18. The second imager 34 includes an image sensor having sensitivity to the wavelength band of light emitted from the first projector 18. For example, when the first projector 18 projects the visible light image as the reference pattern, the second imager 34 includes an image sensor having sensitivity to the wavelength band of visible light. For example, when the first projector 18 projects the infrared light image as the reference pattern, the second imager 34 includes an image sensor having sensitivity to the wavelength band of infrared light.

The pattern extractor 36 extracts (detects) the reference pattern projected onto the object OB by the first projector 18 from the imaging result including the reference pattern of the second imager 34. For example, the second imager 34 images the object OB in a non-projection state, in which the reference pattern is not projected from the first projector 18 and in a projection state, in which the reference pattern is projected from the first projector 18. For example, the pattern extractor 36 calculates a difference between an image acquired by the second imager 34 in the non-projection state and an image acquired by the second imager 34 in the projection state to extract the reference pattern projected onto the object OB. In this case, for example, the pattern extractor 36 can separate the reference pattern from the texture of the object OB.

For example, when the reference pattern includes a code such as a character or a figure, the pattern extractor 36 performs OCR processing, pattern recognition processing, or the like on the extracted reference pattern to read the code included in the reference pattern. For example, the pattern extractor 36 acquires information on the code used for the reference pattern from a memory that stores therein the information on the code. The pattern extractor 36 collates the information on the code and the extracted reference pattern to read the code included in the reference pattern. The information on the code may be stored in a memory 39 (described later) in the second imaging device 2*b* in advance. The information on the code may be stored in a device (for example, the memory 27 in the first imaging device 2*a*) outside the second imaging device 2*b*, and in this case, the pattern extractor 36 may acquire the information on the code through communication with the external device. For example, the pattern extractor 36 generates reference information indicating the extracted reference pattern and stores the reference information in the memory 39.

The second information calculator 33 is provided in the second body 31. The second information calculator 33 uses the imaging result of the second imager 34 to calculate the second model information including at least one of shape information and texture information of the object OB. To calculate the second model information, the second information calculator 33 detects the distance from the second imaging device 2*b* to each point on the surface of the object OB on the basis of a taken image obtained by imaging the second distance measuring pattern projected onto the object OB by the second projector 35 by the second imager 34. The second distance measuring pattern that calculates the second model information may be a pattern similar to the first distance measuring pattern or a pattern different from the first distance measuring pattern.

For example, the second information calculator 33 uses the reference pattern extracted by the pattern extractor 36 to calculate the second model information. For example, when the pattern extractor 36 has detected a code indicating a feature point about the shape information, the second information calculator 33 calculates at least the position of the code and the shape information therearound around the position of the code in the taken image of the second imager 34. For example, when the pattern extractor 36 has detected a code indicating a feature point about the texture information, the second information calculator 33 calculates at least the position of the code and the texture information therearound (around the position of the code) in the taken image of the second imager 34. When the reference pattern includes a code indicating a feature point, for example, the second information calculator 33 can reduce load on processing to extract the feature point and increase the accuracy of detecting the feature point (make the feature point easily recognized). For example, the first embodiment can reduce load on communication compared with a case in which information on the feature point is acquired from the first imaging device 2a through communication.

For example, when the pattern extractor 36 has detected the code RP3 (for example, an edge of a surface of the object OB) illustrated in FIG. 4, the second information calculator 33 can calculate the shape information of the object OB on the assumption that an edge is present at the position of the code or in the vicinity thereof in the taken image of the second imager 34. When the pattern extractor 36 has detected the code RP1 (for example, a plane), the shape information of the object OB can be calculated on the assumption that the part surrounded by the code RP3 around the code RP1 is a plane.

The second imaging device 2b does not necessarily need to include the second information calculator 33. In this case, the second imaging device 2b may supply the imaging result of the second imager 34 to an external device, and this external device may use the detection result of the second imager 34 to calculate the second model information. For example, this external device may be the information processing device 3, the first imaging device 2a, or a device (for example, a cloud computer) outside the imaging system 1.

The second imaging device 2b further includes an inputter 38, a memory 39, a communicator 40, and a display 41. The communicator 40, the display 41, the inputter 38, and the memory 39 may have the same configuration as, for example, the communicator 28, the display 25, the inputter 26, and the memory 27, respectively, in the first imaging device 2a. The controller 40 controls each unit in the second imaging device 2b.

The second controller 37 is held by the second body 31. For example, the second controller 37 controls each unit in the second imaging device 2b through an instruction (a control signal) from a user or an external device (for example, the information processing device 3). For example, the second controller 37 causes the second detector including the second imager 34 to execute detection processing to detect the object OB. For example, in this detection processing, the second controller 37 controls the second projector 35 to cause the second projector 35 to project the second distance measuring pattern onto the object OB. In this detection processing, the second controller 37 controls the second imager 34 to cause the second imager 34 to image the object OB onto which the second distance measuring pattern is projected. For example, the second controller 37 stores at least a part of the taken image by the second imager 34 in the memory 39.

For example, the second controller 37 controls the communicator 40 to acquire information indicating the projection condition for the first projector 18 from the first imaging device 2a. For example, the projection condition for the first projector 18 includes timing of projection at which the first projector 18 projects the reference pattern (reference pattern projection timing). For example, the second controller 37 controls the second imager 34 on the basis of the reference pattern projection timing to image the object OB onto which the reference pattern is projected. For example, the second controller 37 controls the pattern extractor 36 to cause the pattern extractor 36 to execute extraction processing to extract the reference pattern from the taken image by the second imager 34. For example, the second controller 37 stores information on the reference pattern extracted by the pattern extractor 36 in the memory 39.

For example, the second controller 37 controls the second information calculator 33 to calculate the second model information on the basis of the taken image obtained by imaging the object OB onto which the second distance measuring pattern is projected by the second imager 34 and the information on the reference pattern extracted by the pattern extractor 36. For example, the second controller 37 stores at least a part of the second model information calculated by the second information calculator 33 in the memory 39.

Next, an example of each unit in the information processing device 3 is described. For example, the information processing device 3 includes a communicator 51, a memory 52, a model integrator 53, a rendering processor 54, and a controller 55. For example, the communicator 51 includes at least one of a USB port, a network card, or a communication device that performs wireless communication by radio waves or infrared rays. The communicator 51 is communicable with the communicator 28 in the first imaging device 2a and the communicator 40 in the second imaging device 2b.

For example, the memory 52 includes a removable storage medium such as a USB memory or an external or built-in large-capacity storage device such as a hard disk. For example, the memory 52 stores therein data on at least a part of information received via the communicator 51, an imaging control program for controlling the imaging devices 2, and a processing program for executing each processing in the information processing device 3.

The model integrator 53 integrates the first model information calculated on the basis of the result (a first detection result) of detecting the object OB from the first direction and the second model information calculated on the basis of the result (a second detection result) of detecting the object OB from the second direction to generate integrated model information. For example, the model integrator 53 uses the first model information and the collation data supplied from the first imaging device 2a and the second model information and the information on the reference pattern supplied from the second imaging device 2b to perform model integration processing on the object OB.

For example, the model integrator 53 can acquire information on the feature point common to the first partial model indicated by the first model information and the second partial model indicated by the second model information from the information on the reference information. For example, the model integrator 53 can associate the first partial model and the second partial model by using this information on the feature point. For example, the model integrator 53 can reduce load on processing to search for the feature point common to the first partial model and the second partial model or omit this processing.

In the model integration processing, for example, the model integrator 53 collates the collation data from the first imaging device 2a and the information on the reference pattern from the second imaging device 2b to match the feature point in the first model information and the feature point in the second model information. For example, the collation data indicates that the first code of the reference pattern corresponds to the first feature point of the first partial model. For example, the model integrator 53 can detect a part corresponding to the first feature point in the second partial model by searching the reference pattern detected by the second imaging device 2b for the first code. For example, the model integrator 53 overlaps the first feature points of the first partial model and the second partial model to generate an integrated model including the first partial model and the second partial model and to calculate integrated model information indicating the integrated model.

The rendering processor 54 performs rendering processing on the basis of one or both of at least a part of the first model information and at least a part of the second model information. For example, the rendering processor 54 uses the integrated model information calculated by the model integrator 53 on the basis of the first model information and the second model information to perform the rendering processing.

The rendering processor 54 includes, for example, a graphics processing unit (GPU). The rendering processor 54 may be configured such that a CPU and a memory execute each processing in accordance with an image processing program. In the rendering processing, for example, the rendering processor 54 executes at least one of drawing processing, texture mapping processing, or shading processing.

In the drawing processing, for example, the rendering processor 54 can calculate an estimated image (for example, a reconstructed image) in which the shape defined by shape information in model information is viewed from a freely selected viewpoint. In the following description, the shape indicated by shape information is referred to as "model shape". For example, the rendering processor 54 uses at least a part (for example, the shape information) of the first model information to perform the drawing processing. The rendering processor 54 can also perform the drawing processing by using at least a part of the second model information (for example, the shape information). The rendering processor 54 may perform the drawing processing by using at least a part of the first model information and at least a part of the second model information or, for example, may perform the drawing processing by using at least a part of the integrated model information.

For example, the rendering processor 54 can reconstruct a model shape (for example, an estimated image) from model information (for example, shape information) through the drawing processing. For example, the rendering processor 54 stores data on the calculated estimated image in the memory 52. The imaging devices 2 are each capable of transmitting at least a part of the model information to the information processing device 3, and hence, for example, the information processing device 3 can reduce load on the rendering processing. For example, the imaging devices 2 do not need to transmit all images taken by the first imager 15 to the information processing device 3, but can transmit at least a part of the model information (for example, shape information and texture information) calculated by the first information calculator 12 to the information processing device 3. Consequently, the imaging devices 2 according to the first embodiment can each reduce communication load on information necessary for the drawing processing by the rendering processor 54.

In the texture mapping processing, for example, the rendering processor 54 can calculate an estimated image obtained by attaching an image indicated by the texture information in the model information to the surface of the object on the estimated image. The rendering processor 54 can also calculate an estimated image obtained by attaching another texture than the object OB on the surface of the object on the estimated image.

In the shading processing, for example, the rendering processor 54 can calculate an estimated image in which the shade formed by a light source indicated by the light source information in the model information is added to the object on the estimated image. In the shading processing, for example, the rendering processor 54 can calculate an estimated image in which the shade formed by a freely selected light source is added to the object on the estimated image.

For example, the controller 55 controls each unit in the information processing device 3, the imaging devices 2, the input device 4, and the display device 5. For example, the controller 55 controls the communicator 51 to transmit an instruction (a control signal) and setting information to each of the imaging devices 2. For example, the controller 55 stores information received by the communicator 51 from the imaging devices 2 in the memory 52. For example, the controller 55 controls the rendering processor 54 to execute the rendering processing.

For example, the controller 55 controls the imaging devices 2 by transmitting an instruction (a signal) to the imaging devices 2 via the communicator 51. For example, the controller 55 controls the communicator 51 to transmit, to the imaging devices 2, an instruction (a request signal) that requests transmission of certain information. The controller 55 may transmit an instruction that instructs the imaging devices 2 to execute each processing to the imaging devices 2. For example, the controller 55 may transmit an instruction that instructs the first detector 11 in the first imaging device 2a to execute detection processing to the first imaging device 2a. For example, the controller 55 may transmit an instruction that instructs the first information calculator 12 in the first imaging device 2a to execute processing to calculate the model information to the first imaging device 2a. The controller 55 in the information processing device 3 may transmit an instruction that instructs the first imager 15 in the first imaging device 2a to execute imaging of the object OB and an instruction that instructs the first imager 15 to set imaging conditions for the object OB to the first imaging device 2a. The controller 55 in the information processing device 3 may transmit an instruction that causes the first imaging device 2a to execute processing to detect the identification information of the second imaging device 2b to the first imaging device 2a.

For example, the communicator 28 transmits information calculated by the first information calculator 12 selectively for each item. For example, the setting information stored in the memory 27 includes transmission item information that defines whether to transmit information on each item in the model information and transmission order information that defines the order of transmitting the information on each item. For example, the setting information can be updated by operation of the inputter 26 or an instruction from the information processing device 3. For example, the first controller 19 controls the communicator 28 to transmit the information on items determined by the transmission item information in the order determined by the transmission order information. For example, the first controller 19 may control the communicator 28 to transmit the information on items (for example, shape information and texture information) determined by the transmission item information at a time on the basis of a certain data format.

For example, the transmission item information may be set in accordance with whether corresponding information is used for the rendering processing by the information processing device 3. For example, in some cases, the rendering processing involves combining the shape of the object OB with texture different from the object OB. In this case, for example, the information processing device 3 can execute the rendering processing by using the shape information of the object OB without using the texture information of the object OB. For example, the transmission item information is set as information that defines that the shape information is transmitted but the texture information is not transmitted. In this case, the first information calculator 12 does not necessarily need to calculate the texture information.

For example, the rendering processing may involve calculating an image in which illumination conditions on the object OB are changed. For example, the information processing device 3 can execute the rendering processing by using the shape information, the pattern information, and the optical characteristics information on the object OB without using the light source information. In this case, for example, the transmission item information is set as information that defines that the shape information, the pattern information, and the optical characteristics information are transmitted but the light source information is not transmitted. For example, the transmission item information is set as information that defines that at least one piece of information of the shape information, the texture information, the pattern information, the light source information, or the optical characteristics information is transmitted. The imaging devices 2 can reduce load on communication when a part of the model information is transmitted, for example.

For example, the transmission order information may be set depending on the priority order in the rendering processing by the information processing device 3. For example, the transmission order information may be set such that information on an item that is used first in the rendering processing is transmitted first. For example, in some cases, the rendering processing involves calculating an image of an object OB having no texture while changing viewpoints and after determining the viewpoint, calculating an image of an object OB having texture viewed from the viewpoint. For example, the information processing device 3 can calculate an image of the object OB having no texture while changing the viewpoint by using the shape information without using the texture information. For example, the transmission item information is set as information that defines that the shape information is transmitted first and the texture information is transmitted after the shape information. For example, when the information on each item in the model information is transmitted in the order corresponding to the priority order in the rendering processing by the information processing device 3, the imaging devices 2 can transmit the information in parallel to a part of the rendering processing by the information processing device 3. For example, the first controller 19 in the first imaging device 2*a* can concurrently execute at least a part of the calculation of the model information by the first information calculator 12 and the information transmission processing by the communicator 28.

For example, the controller 55 in the information processing device 3 stores information input to the input device 4 in the memory 52. The information input to the input device 4 includes, for example, setting information in the rendering processing. The setting information includes, for example, at least one of data subjected to the drawing processing (for example, the shape information in the model information), information on the viewpoint in the drawing processing, data on an object to which texture is attached in the texture mapping processing, information (for example, the texture information in the model information) on the texture to be attached in the texture mapping processing, or information (for example, the light source information in the model information) on a light source in the shading processing. For example, the rendering processor 54 executes the rendering processing in accordance with the setting information.

For example, the controller 55 displays an image indicating various kinds of information stored in the memory 52 on the display device 5. For example, the controller 55 displays the setting information in the rendering processing on the display device 5 and receives a change of the setting information by the input device 4. The controller 55 displays an image indicated by the estimated image data stored in the memory 52 on the display device 5.

The information processing device 3 does not necessarily need to display the estimated image obtained by the rendering processing on the display device 5, and in this case, the imaging system 1 does not necessarily need to include the display device 5. For example, the information processing device 3 may transmit at least a part of the estimated image data calculated through the rendering processing to another device (a reproduction device) via the communicator 51, and the other device may display the image. For example, the information processing device 3 may transmit the estimated image data to the communicator 28 in the first imaging device 2*a* via the communicator 51, and the first imaging device 2*a* may display an estimated image on the display 25 on the basis of the estimated image data received via the communicator 28. For example, the reproduction device acquires information (the estimated image) calculated through rendering processing and displays the information on the display.

The information processing device 3 may receive various kinds of setting information from another device via the communicator 51, and in this case, the imaging system 1 does not necessarily need to include the input device 4. For example, the first imaging device 2*a* may transmit the setting information in the rendering processing (for example, information on viewpoint based on which the estimated image is calculated) to the communicator 51 in the information processing device 3 via the communicator 28. The information processing device 3 may execute the rendering processing in accordance with the setting information in the rendering processing received from the first imaging device 2*a*.

The first imaging device 2*a* may transmit an instruction that requests the estimated image data calculated through the rendering processing to the communicator 51 in the information processing device 3 via the communicator 28. The information processing device 3 may transmit the estimated image data to the communicator 28 in the first imaging device 2*a* via the communicator 51 as a response to the instruction from the first imaging device 2*a*. The first imaging device 2*a* may transmit the above-mentioned request instruction as a part of the setting information in the rendering processing or as another instruction (for example, a control signal) than the setting information in the rendering processing.

When executing the above-mentioned various kinds of processing under the control of the information processing device 3, the first imaging device 2*a* does not necessarily need to include at least a part of the first controller 19, the memory 27, the display 25, and the inputter 26. The same holds true for the second imaging device 2*b*. For example, the first imaging device 2a may execute the various kinds of processing described above in response to user's operation and does not necessarily need to be controlled by the information processing device 3. For example, the first imaging device 2a may execute the various kinds of processing described above without receiving any instruction (control signal) from an external device and may execute the various kinds of processing described above in response to user's operation or in accordance with a preset processing schedule. The first imaging device 2a may transmit calculation results of the first information calculator 12 (for example, the model information) to another device in the information processing device 3 via the communicator 28.

Figure 5:
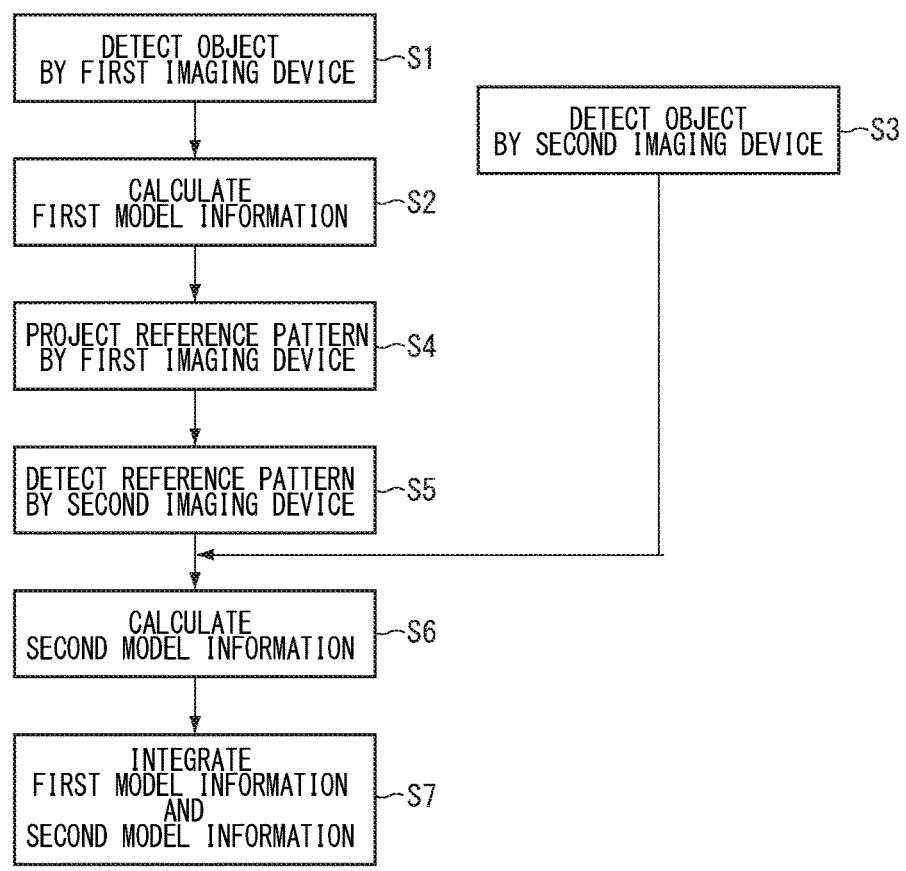
FIG. 5 is a flowchart illustrating a method of imaging according to the first embodiment.

Next, a method of imaging according to the first embodiment is described on the basis of an operation of the imaging system 1. FIG. 5 is a flowchart illustrating the method of imaging according to the first embodiment. In Step S1, the imaging system 1 detects the object by the first imaging device 2a. For example, the first controller 19 controls the first imager 15 to cause the first imager 15 to image the object OB. In Step S2, the imaging system 1 calculates the first model information. For example, the first controller 19 controls the first information calculator 12 to calculate the first model information of the object OB on the basis of the imaging result of the first imager 15. In Step S3, the imaging system 1 detects the object by the second imaging device 2b. For example, the second controller 37 controls the second imager 34 to cause the second imager 34 to image the object OB.

In Step S4, the imaging system 1 causes the first imaging device 2a to project the reference pattern. For example, the first controller 19 controls the feature extractor 16 to extract the feature point from the first model information and controls the pattern setter 17 to set a pattern associated with information on the extracted feature point as the reference pattern. The first controller 19 transmits a control signal indicating an instruction that projects the reference pattern onto the object OB to the first projector 18 to control the first projector 18 to project the reference pattern set by the pattern setter 17 toward the object OB.

In Step S5, the imaging system 1 detects the reference pattern by the second imaging device 2b. For example, the second controller 37 controls the second imager 34 to image the object OB onto which the reference pattern is projected. The second controller 37 controls the pattern extractor 36 to extract the reference pattern from the taken image by the second imager 34.

In Step S6, the imaging system 1 calculates the second model information. For example, the second controller 37 controls the second information calculator 33 to calculate the second model information of the object OB on the basis of the imaging result of the second imager 34 in Step S3 and the detection result of the reference pattern in Step S5.

In Step S7, the imaging system 1 integrates the first model information and the second model information. For example, the controller 55 in the information processing device 3 acquires the first model information from the first imaging device 2a and acquires the second model information from the second imaging device 2b. The controller 55 controls the model integrator 53 to integrate the first model information and the second model information. For example, the model integrator 53 uses the detection result of the reference pattern detected by the second imaging device 2b to execute the model integration processing and to calculate the integrated model information.

Figure 6:
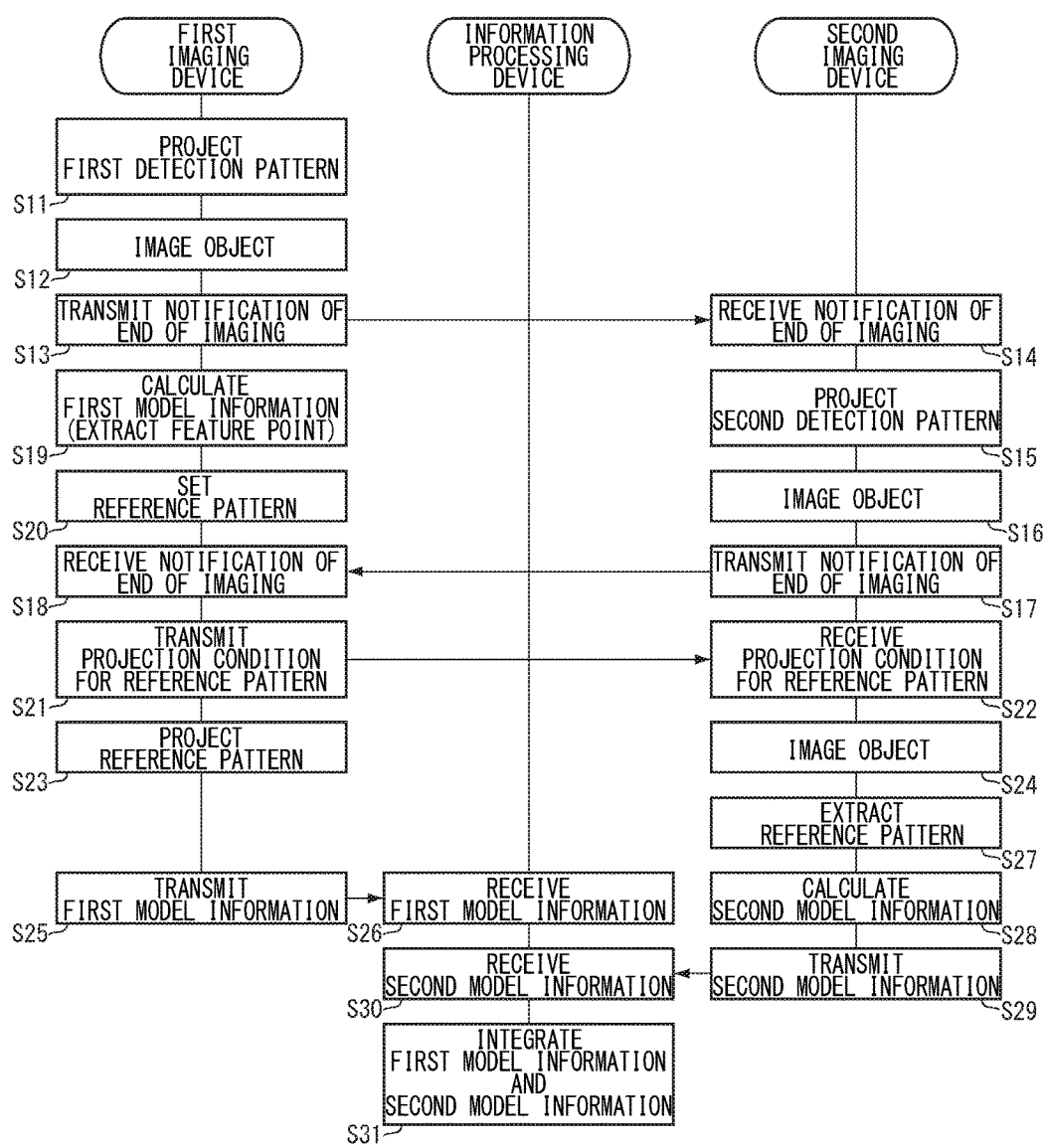
FIG. 6 is a diagram illustrating an example of an operation of the imaging system according to the first embodiment.

Next, an example of the operation of the imaging system 1 is described. FIG. 6 is a sequence diagram illustrating the example of the operation of the imaging system 1 according to the first embodiment. In Step S11, the first projector 18 in the first imaging device 2a projects the first distance measuring pattern onto the object OB. In Step S12, the first imager 15 in the first imaging device 2a images the object OB onto which the first distance measuring pattern is projected. In Step S13, the communicator 28 in the first imaging device 2a transmits notification (for example, a signal) indicating that the imaging has ended to the communicator 40 in the second imaging device 2b. In Step S14, the communicator 40 receives the notification in Step S13.

The second projector 35 in the second imaging device 2b, after receiving the notification in Step S13, in Step S15, projects the second distance measuring pattern onto the object OB. In Step S16, the second imager 34 in the second imaging device 2b images the object OB onto which the second distance measuring pattern is projected. In Step S17, the communicator 40 in the second imaging device 2b transmits notification indicating that the imaging has ended to the communicator 28 in the first imaging device 2a. In Step S18, the communicator 28 receives the notification in Step S17.

The first information calculator 12 in the first imaging device 2a calculates the first model information after the notification in Step S13 has been transmitted. In Step S13, the first information calculator 12 or the feature extractor 16 performs processing to extract at least a feature point. In Step S14, the pattern setter 17 in the first imaging device 2a sets a pattern associated with, for example, information on the feature point as the reference pattern.

The communicator 28 in the first imaging device 2a, after receiving the notification in Step S17, in Step S21, transmits a projection condition for the reference pattern to the communicator 40 in the second imaging device 2b. In Step S22, the communicator 40 receives the projection condition for the reference pattern. In Step S23, the first projector 18 in the first imaging device 2a projects the reference pattern toward the object OB in accordance with a schedule provided in the projection condition. In Step S24, the second imager 34 in the second imaging device 2b images the object OB onto which the reference pattern is projected in accordance with the schedule provided in the projection condition.

In Step S25, the communicator 28 in the first imaging device 2a transmits the first model information to the communicator 51 in the information processing device 3. In Step S26, the communicator 51 receives the first model information. In Step S27, the pattern extractor 36 in the second imaging device 2b extracts the reference pattern from the taken image of the second imager 34 in Step S24. In Step S28, the second information calculator 33 in the second imaging device 2b calculates the second model information. In Step S29, the communicator 40 in the second imaging device 2b transmits the second model information to the communicator 51 in the information processing device 3. In Step S30, the communicator 51 receives the second model information. In Step S31, the model integrator 53 in the information processing device 3 integrates the first model information and the second model information.

Figure 7:
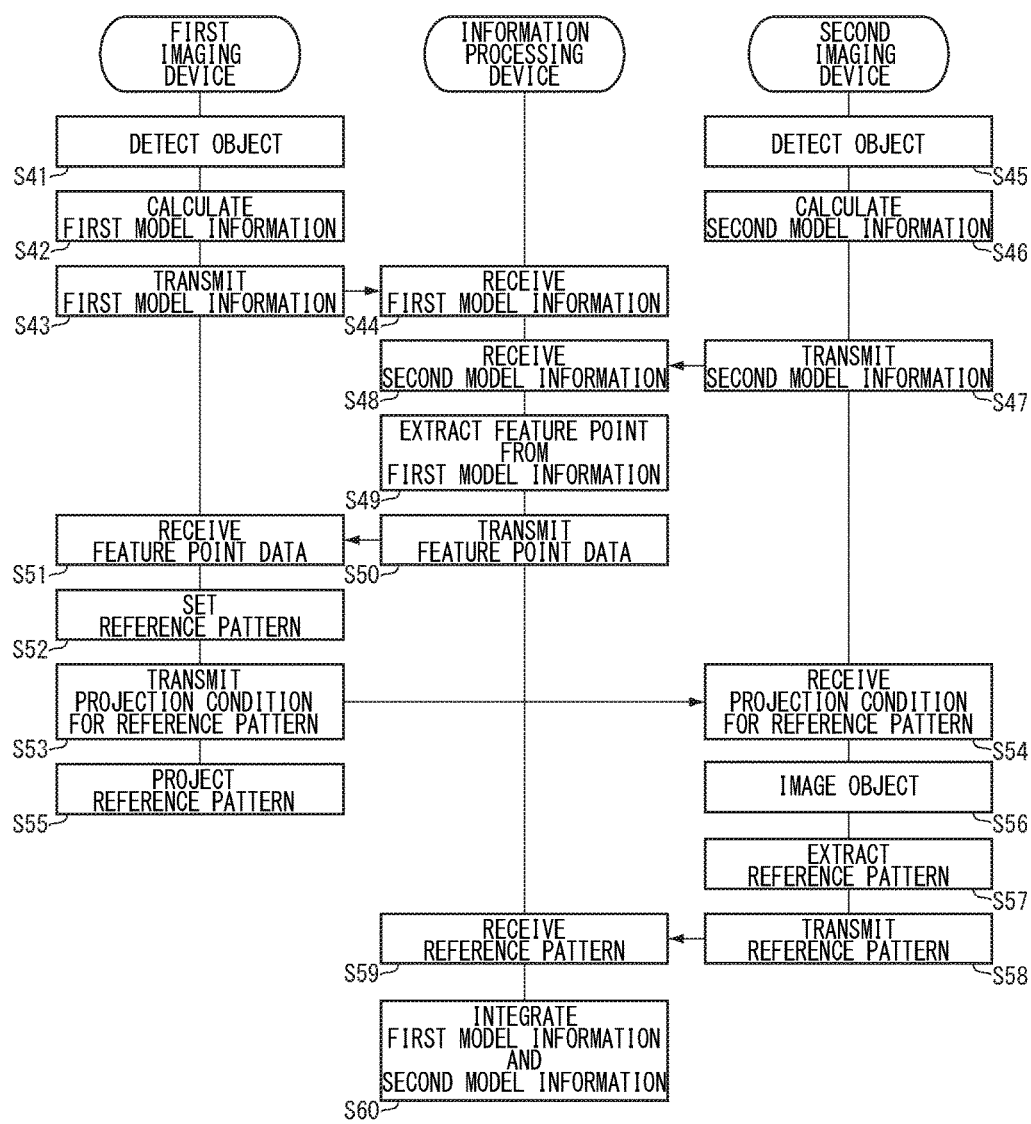
FIG. 7 is a diagram illustrating another example of the operation of the imaging system according to the first embodiment.

FIG. 7 is a sequence diagram illustrating another example of the operation of the imaging system 1 according to the first embodiment. Descriptions of pieces of processing common to FIG. 6 are simplified or omitted. The first imaging device 2a detects the object OB in Step S41 and calculates the first model information in Step S42. In Step S43, the first imaging device 2a transmits the first model information to the information processing device 3. In Step S44, the information processing device 3 receives the first model information. The second imaging device 2b detects the object OB in Step S45 and calculates the second model information in Step S46. In Step S47, the second imaging device 2b transmits the second model information to the information processing device 3. In Step S48, the information processing device 3 receives the second model information.

In Step S49, the model integrator 53 in the information processing device 3 extracts the feature point from the first model information and generates the feature point data (the first feature point data) indicating the feature amount at the feature point. In Step S50, the communicator 51 in the information processing device 3 transmits the feature point data to the communicator 28 in the first imaging device 2a. In Step S51, the communicator 28 receives the feature point data. In Step S52, the pattern setter 17 in the first imaging device 2a sets the reference pattern on the basis of the feature point data. In Step S53, the communicator 28 in the first imaging device 2a transmits the projection condition for the reference pattern to the communicator 40 in the second imaging device 2b. In Step S54, the communicator 40 receives the projection condition for the reference pattern. In Step S55, the first projector 18 in the first imaging device 2a projects the reference pattern. In Step S56, the second imager 34 in the second imaging device 2b images the object OB onto which the reference pattern is projected. In Step S57, pattern extractor 36 in the second imaging device 2b extracts the reference pattern and generates the reference information indicating the extracted reference pattern. In Step S58, the communicator 40 in the second imaging device 2b transmits the reference information to the communicator 51 in the information processing device 3. In Step S59, the communicator 51 receives the reference information. For example, the reference information includes data (second feature point data) on the feature point in the second model information. In Step S60, the model integrator 53 in the information processing device 3 uses the first model information, the first feature point data, the second model information, and the reference information (the second feature point data) to perform the model integration processing.

Thus, the first imaging device 2a does not necessarily need to extract the feature point from the first model information, and the information processing device 3 may extract the future point. The second imaging device 2b may calculate the second model information without using the result that the reference pattern has been detected.

Figure 8:
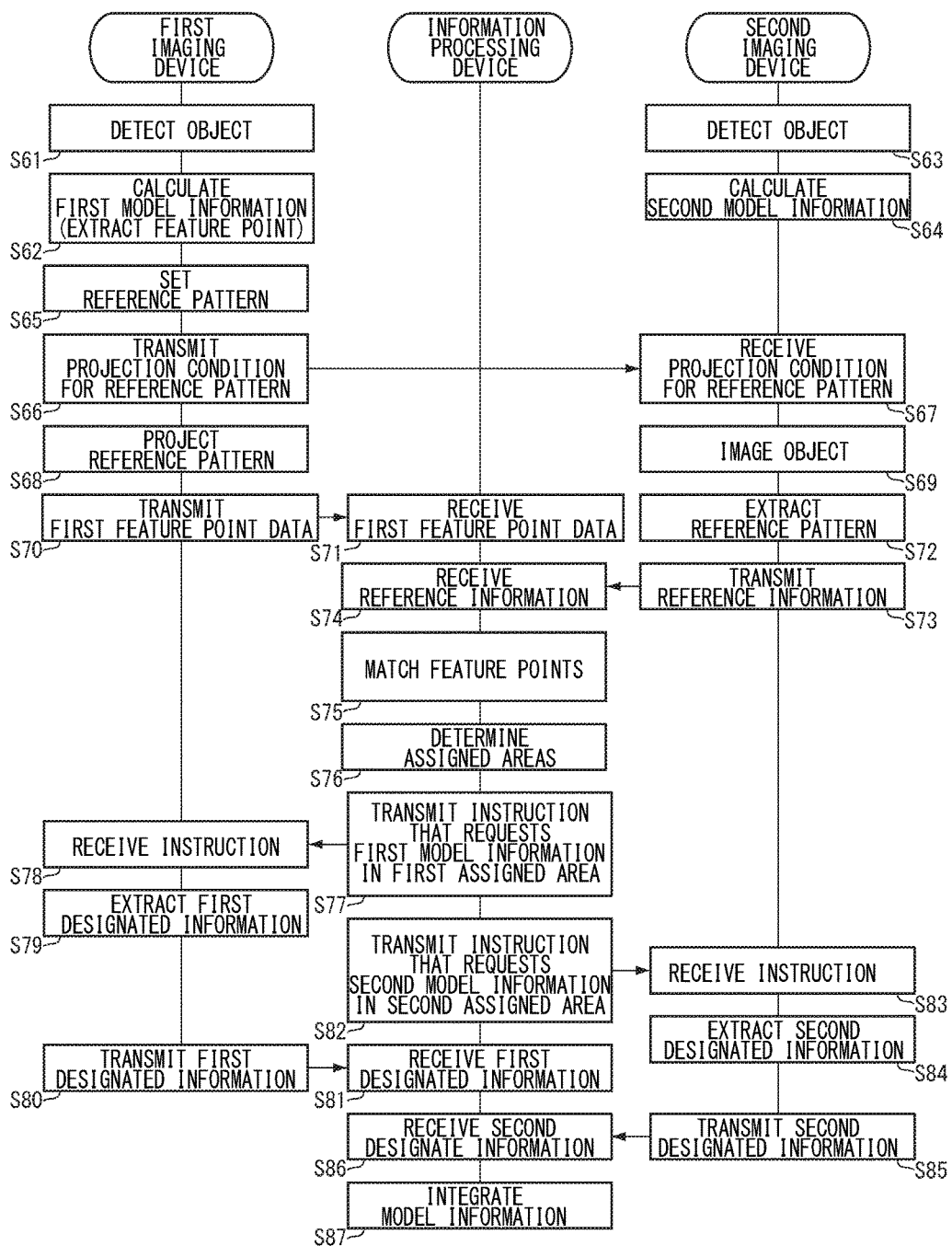
FIG. 8 is a diagram illustrating another example of the operation of the imaging system according to the first embodiment.

FIG. 8 is a sequence diagram illustrating another example of the operation of the imaging system 1 according to the first embodiment. Descriptions of piece of processing common to FIG. 6 and FIG. 7 are simplified. The first imaging device 2a detects the object OB in Step S61 and calculates the first model information (extracts at least the feature point) in Step S62. In Step S65, the first imaging device 2a sets the reference pattern. In Step S66, the first imaging device 2a transmits the projection condition for the reference pattern to the second imaging device 2b. In Step S67, the second imaging device 2b receives the projection condition for the reference pattern. In Step S68, the first imaging device 2a projects the reference pattern. In Step S69, the second imaging device 2b images the object OB onto which the reference pattern is projected.

In Step S70, the first imaging device 2a transmits the feature point data (the first feature point data) to the information processing device 3. In Step S71, the information processing device 3 receives the feature point data. In Step S72, the second imaging device 2b extracts the reference pattern from the taken image in Step S69. In Step S73, the second imaging device 2b transmits the reference information to the information processing device 3. In Step S74, the information processing device 3 receives the reference information. The reference information is information obtained from the reference pattern detected by the second imaging device 2b and, for example, includes the data (the second feature point data) on the feature point in the second model information.

In Step S75, the model integrator 53 in the information processing device 3 matches the feature point included in the first feature point data and the feature point indicated in the reference information (the second feature point data). In Step S76, the information processing device 3 determines and sets a first assigned area to be assigned to the first model information from the first imaging device 2a and a second assigned area to be assigned to the second model information from the second imaging device 2b in the integrated model information. For example, the model integrator 53 selects the assigned areas such that the first assigned area and the second assigned area do not overlap with each other.

In Step S77, the controller 55 in the information processing device 3 controls the communicator 51 to transmit an instruction (a first request signal) that requests transmission of the first model information in the first assigned area to the communicator 28 in the first imaging device 2a. The first model information in the first assigned area is hereinafter referred to as "first designated information". Examples of the first designated information include information on a partial shape of the shape indicated by the first model information. In Step S78, the communicator 28 in the first imaging device 2a receives the instruction in Step S77. In Step S79, the first information calculator 12 in the first imaging device 2a extracts the first designated information in the first model information. In Step S80, the communicator 28 in the first imaging device 2a transmits the first designated information to the communicator 51 in the information processing device 3, and the communicator 51 receives the first designated information.

In Step S82 after the processing in Step S77, the controller 55 in the information processing device 3 controls the communicator 51 to transmit an instruction (a second request signal) that requests transmission of the second model information in the second assigned area to the communicator 40 in the second imaging device 2b. The second model information in the second assigned area is hereinafter referred to as "second designated information". Examples of the second designated information include information on a partial shape of the shape indicated by the second model information. In Step S83, the communicator 40 in the second imaging device 2b receives the instruction in Step S82. In Step S84, the second information calculator 33 in the second imaging device 2b extracts the second designated information in the second model information. In Step S85, the communicator 40 in the second imaging device 2b transmits the second designated information to the communicator 51 in the information processing device 3. In Step S86, the communicator 51 receives the second designated information. In Step S87, the model integrator 53 integrates the first designated information, which is a part of the first model information, and the second designated information, which is a part of the second model information, to calculate the integrated model information. As described above, the imaging device 2 in the first embodiment includes the body (14, 31), the imager (15, 34) that is provided in the body (14, 31) and images the object OB and the reference pattern projected onto the object OB, the pattern extractor 36 that extract the reference pattern projected onto the object OB from the imaging result of the imager (15, 34), and the information calculator (12, 33) that is provided in the body (14, 31) and uses the imaging result of the imager (15, 34) and the reference pattern extracted by the pattern extractor 36 to calculate the model information including at least one of the shape information and the texture information of the object OB. For example, the second imaging device 2b includes the second body 31, the second imager 34 that is provided in the second body 31 and images the object OB and the reference pattern projected onto the object OB simultaneously or as one image, the pattern extractor 36 that extracts the reference pattern projected onto the object OB from the imaging result of the second imager 34, and the second information calculator 33 that is provided in the second body 31 and uses the imaging result of the second imager 34 and the reference pattern extracted by the pattern extractor 36 to calculate the model information including at least one of the shape information and the texture information of the object OB. As described above, the reference pattern is a pattern indicating at least a part of the first model information that is different from the second model information calculated by the information calculator (for example, the second information calculator 33) and is calculated by another information calculator (for example, the first information calculator 12).

By using the reference pattern (see the code RP5 in FIG. 4) detected by the second imaging device 2b, the overlapping part of the first partial model provided in the first model information and the second partial model provided in the second model information can be detected. For example, the model integrator 53 can determine the assigned areas in Step S76 by using information on the overlapping part. In this case, by performing the model integration processing using the first designated information, which is a part of the first model information, and the second designated information, which is a part of the second model information, the overlapping part of the two can be easily detected, which, for example, can reduce load on communication and reduce load on the model integration processing.

Second Embodiment

Figure 9:
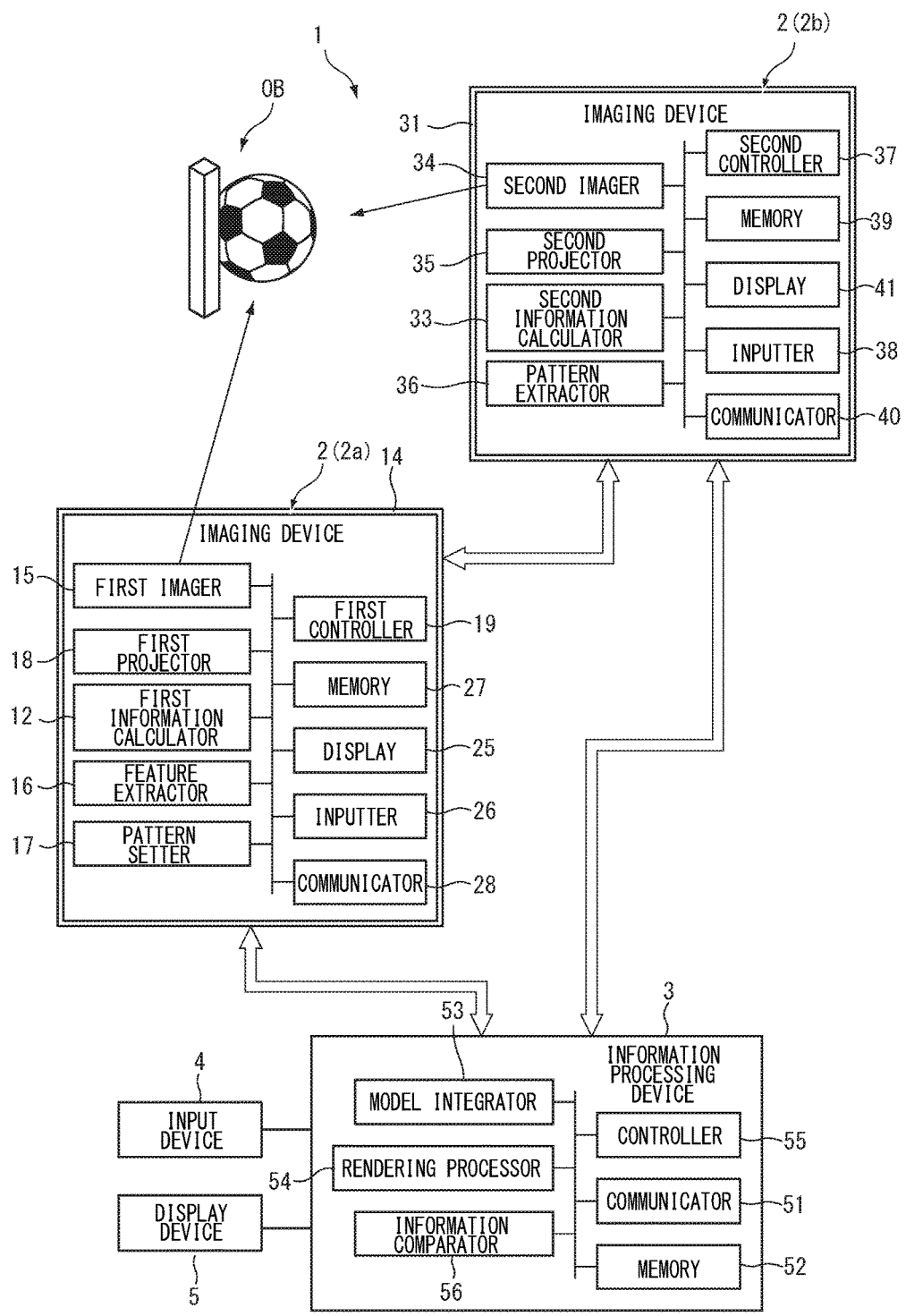
FIG. 9 is a block diagram illustrating an imaging system according to a second embodiment.

A second embodiment is described. In the second embodiment, the same configurations as those in the above-mentioned embodiment are denoted by the same reference symbols and descriptions thereof are simplified or omitted. FIG. 9 is a block diagram illustrating the imaging system 1 according to the second embodiment.

As an example, the imaging system 1 can fail to detect recessed parts and gaps such as openings of the object OB. For example, the imaging system 1 may fail to distinguish an inner wall of an opening and a virtual surface blocking the opening. In such a case, when a wire frame or the like is projected onto an object on the basis of the first model information, for example, the wire frame is discontinuous between the inner wall of the opening and the outside of the opening, whereby the imaging system 1 can detect a part deficient in accuracy in the first model information.

The imaging system 1 according to the second embodiment includes an information comparator (a comparer) 56 that calculates information used for the evaluation of the model information. For example, the information comparator 56 is provided in the information processing device 3, or may be provided in at least one (for example, the first imaging device 2a) of the imaging devices 2, or may be provided in another device. The information comparator 56 compares model information obtained from a taken image obtained by imaging the object OB and information obtained from a taken image obtained by imaging the object OB onto which a second reference pattern set on the basis of this model information is projected.

For example, the rendering processor 54 in the information processing device 3 acquires the first model information from the first imaging device 2a to perform rendering processing. For example, the rendering processor 54 generates data on an image (for example, an estimated image obtained by adding a texture of a wire frame to the surface of the object OB) representing the surface of the object OB with a wire frame. For example, the pattern setter 17 sets the second reference pattern that displays the wire frame on the surface of the object OB on the basis of a processing result of the rendering processor 54. For example, the first imager 15 images the object OB in a projection state, in which the second reference pattern is projected, and a non-projection state, in which the second reference pattern is not projected.

For example, the information comparator 56 calculates a difference between a taken image in the projection state and a taken image in the non-projection state acquired by the first imager 15 and detects the second reference pattern on the object OB in the field of view of the first imager 15. For example, the information comparator 56 calculates a deviation amount between the texture added in the rendering processing and the second reference pattern detected in the field of view of the first imager 15. For example, the information comparator 56 may determine (evaluate) that the accuracy of the first model information is insufficient in a part in which the calculated deviation amount is larger than a threshold.

For example, the second imager 34 images the object OB in the projection state, in which the second reference pattern is projected and the non-projection state, in which the second reference pattern is not projected. For example, the information comparator 56 calculates a difference between a taken image in the projection state and a taken image in the non-projection state acquired by the second imager 34 and detects the second reference pattern on the object OB in the field of view of the second imager 34. For example, the information comparator 56 calculates a deviation amount of the second reference pattern detected in the field of view of the second imager 34 and may determine (evaluate) that the accuracy of the first model information is insufficient in a part in which the calculated deviation amount is larger than a threshold. For example, when the second reference pattern projected by the first imaging device 2a is detected, a rendering asymmetric area in the first model information can be acquired from the detection result of the second imaging device 2b.

For example, the imaging system 1 may correct the model information (for example, the first model information, the second model information, and the integrated model information) by using at least one of the deviation amount of the second reference pattern detected in the field of view of the first imager 15 and the deviation amount of the second reference pattern detected in the field of view of the second imager 34. For example, the first imaging device 2a images the object OB by the first imager 15 while changing the texture added to the object OB by changing the second reference pattern by the pattern setter 17. For example, the information comparator 56 monitors a change in the deviation amount of the second reference pattern detected in the field of view of the first imager 15 along with a change in the second reference pattern. For example, the imaging system 1 may correct the model information on the basis of the second reference pattern when the deviation amount of the second reference pattern decreases. In this case, the accuracy of the model information can be increased by the application and the imaging of the reference pattern.

Figure 10:
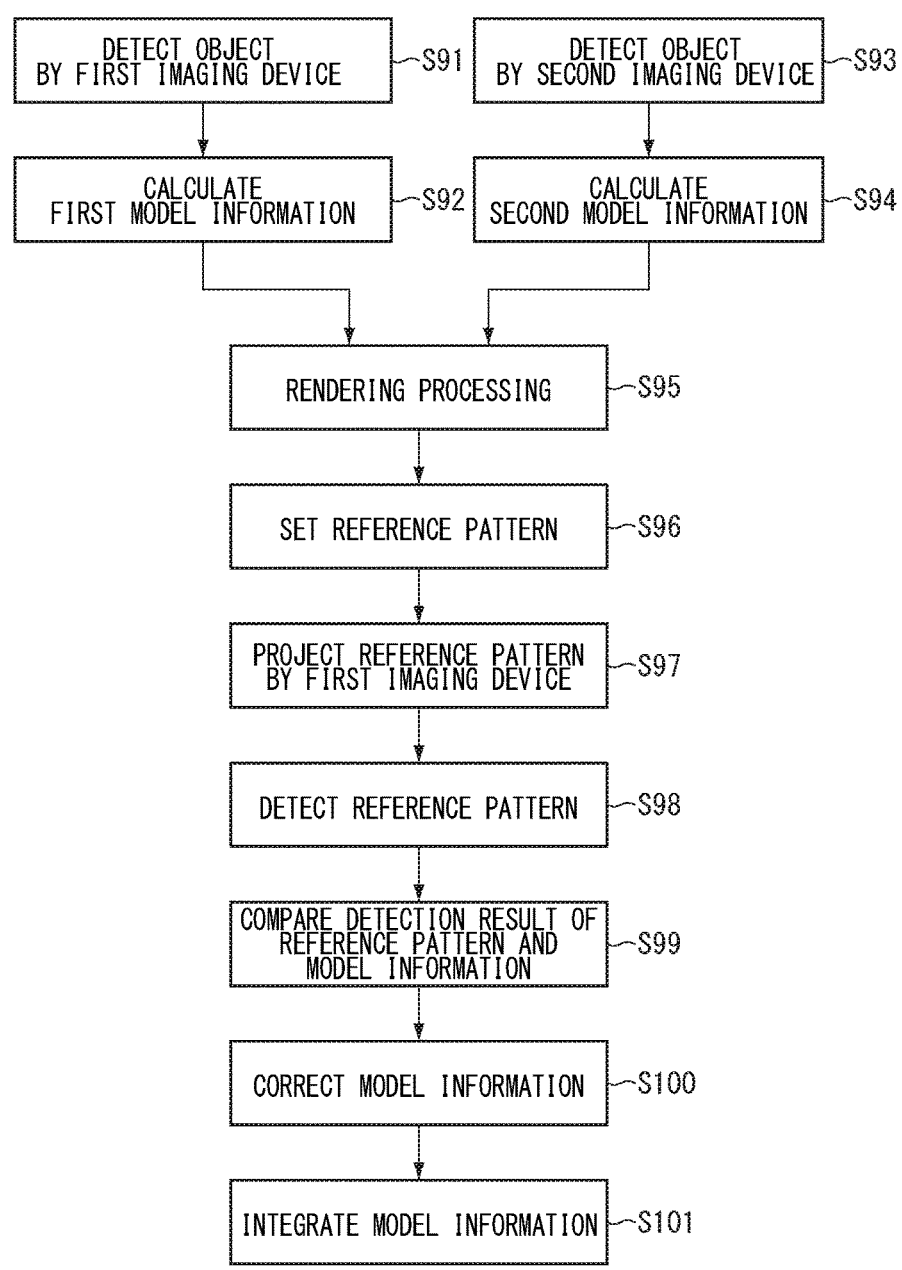
FIG. 10 is a flowchart illustrating a method of imaging according to the second embodiment.

Next, a method of imaging according to the second embodiment is described on the basis of the operation of the imaging system 1. FIG. 10 is a flowchart illustrating the method of imaging according to the second embodiment. In Step S91, the imaging system 1 detects (images) the object OB by the first imaging device 2*a*. In Step S92, the imaging system 1 calculates the first model information on the basis of the imaging result in Step S91. In Step S93, the imaging system 1 detects (images) the object OB by the second imaging device 2*b*. In Step S94, the imaging system 1 calculates the second model information on the basis of the imaging result in Step S93.

In Step S95, the imaging system 1 performs rendering processing by the rendering processor 54 on the basis of model information (for example, the first model information). In Step S96, the imaging system 1 sets the reference pattern by the pattern setter 17 on the basis of a result of the rendering processing in Step S95. In Step S97, the imaging system 1 projects the reference pattern toward the object OB by the first imaging device 2*a* (for example, the first projector 18). In Step S98, the imaging system 1 images the object OB by at least one of the first imaging device 2*a* and the second imaging device 2*b* and detects the reference pattern on the object OB. In Step S99, the imaging system 1 compares the detection result of the reference pattern and the model information by the information comparator 56. In Step S100, the imaging system 1 corrects the model information (for example, the first model information) on the basis of a comparison result in Step S99. In Step S101, the imaging system 1 uses the model information corrected in Step S100 to perform the model integration processing by the model integrator 53.

The first projector 18 may project the reference pattern set on the basis of the model information while changing a projection magnification. For example, the pattern setter may set a pattern indicating the contour of the object OB as the reference pattern, whereas the first projector 18 may project the reference pattern enlarged or reduced. For example, the first projector 18 first sets the projection magnification that causes the pattern indicating the contour of the object OB to be displayed on the object OB. The first projector 18 projects the pattern while increasing the projection magnification, and the first imager 15 detects a change in the pattern indicating the contour of the object OB. In this case, for example, the scale (for example, the actual size) of the object OB can be estimated from the projection magnification. For example, when a part of the pattern indicating the contour is not displayed on the object OB, information on the part that is not displayed can be used for the evaluation of the validity of the modeling result.

In the above-mentioned embodiments, for example, the imaging devices 2 can obtain information indicating a correspondence (positional relation) between a plurality of fields of view and can associate information obtained with a first field of view and information obtained with a second field of view with each other with high precision.

The technical scope of the present invention is not limited to the above-mentioned embodiments or modifications thereof. For example, the controller in the above-mentioned embodiments reads an imaging program stored in a storage device (for example, the memory) and executes the above-mentioned various kinds of processing in accordance with this imaging program. For example, this imaging program causes a computer to execute the above-mentioned various kinds of processing. This imaging program may be recorded in a computer-readable recording medium to be provided. For example, at least one of the elements described in the above-mentioned embodiments or modifications thereof are sometimes omitted. The elements described in the above-mentioned embodiments or modifications thereof can be combined as appropriate.

In the above-mentioned embodiments, the imaging devices 2 communicate the projection condition to perform the projection and the imaging of the reference pattern in synchronization with each other; the projection condition does not necessarily need to be communicated. For example, the imaging devices 2 may perform various kinds of processing such as the projection processing and the imaging processing in accordance with a preset schedule. Schedule information indicating this schedule may be stored in each memory of the imaging devices 2. At least one imaging device (for example, the first imaging device 2*a*) of the imaging devices 2 may project a pattern (for example, a code) indicating the schedule information. In this case, another imaging device (for example, the second imaging device 2*b*) may detect this pattern through imaging and acquire information included in the pattern through decoding to acquire the schedule information. At least one imaging device (for example, the second imaging device 2*b*) of the imaging devices 2, when another imaging device (for example, the first imaging device 2*a*) is within its field of view, may detect the operation (for example, emission of illumination or emission during projection) of the first imaging device 2*a* through imaging or the like and use the detection result as a synchronization signal to make synchronization with the other imaging device.

DESCRIPTION OF REFERENCE SIGNS

1 Imaging system
2*a* First imaging device
2*b* Second imaging device
3 Information processing device
4 Input device
5 Display device
12 First information calculator
14 First body
15 First imager
16 Feature extractor
17 Pattern setter
18 First projector
19 First controller
31 Second body
33 Second information calculator
34 Second imager
35 Second projector
36 Pattern extractor
37 Second controller
53 Model integrator
54 Rendering processor
55 Controller
56 Information comparator

What is claimed is:
1. An imaging system, comprising:
  a first imaging device including:
    a first body;
    a first imager including a first image sensor, the first imager disposed in the first body and configured to image an object; and
    a first projector;
  the first imaging device configured to:

calculate first model information including at least one of shape information and texture information of the object based on an imaging result of the first imager;
set a reference pattern indicating at least a part of the calculated first model information; and
project the reference pattern toward the object; and
a second imaging device including:
a second body; and
a second imager including a second image sensor, the second imager disposed in the second body and configured to image the object onto which the reference pattern is projected;
the second imaging device configured to:
calculate second model information including at least one of shape information and texture information of the object based on an imaging result of the second imager; and
extract the reference pattern projected by the first projector from the imaging result of the second imager.

2. The imaging system according to claim 1, wherein the second imaging device uses the extracted reference pattern to calculate the second model information.

3. The imaging system according to claim 1, wherein the first imaging device is further configured to
extract a feature part identifiable from other parts in the first model information, and
sets a pattern associated with information on the feature part as the reference pattern.

4. The imaging system according to claim 1, comprising an information processing device including a processor and configured to integrate the first model information calculated by the first imaging device and the second model information calculated by the second imaging device.

5. The imaging system according to claim 1, wherein the first imaging device
calculates surface information including coordinates of a plurality of points on a surface of the object and link information among the points as the shape information, and
sets a pattern associated with the surface information as the reference pattern.

6. The imaging system according to claim 1, comprising an information processing device including a processor and configured to perform rendering processing based on one or both of at least a part of the first model information and at least a part of the second model information, wherein
the first imaging device sets as the reference pattern a pattern associated with the at least one of the shape information and the texture information of the object based on a processing result of the rendering processing.

7. The imaging system according to claim 1, wherein the first imaging device sets a pattern associated with identification information of the first imager as the reference pattern.

8. The imaging system according to claim 1, wherein the first imaging device sets a pattern with a light intensity distribution temporally changing as the reference pattern.

9. The imaging system according to claim 1, wherein the first imaging device supplies information on the reference pattern to the second imaging device.

10. The imaging system according to claim 1, wherein one of the first imaging device, the second imaging device, and an information processing device including a processor is configured to compare (i) information on the object obtained from a taken image obtained by imaging the object onto which the reference pattern is projected and (ii) information on the object obtained from a taken image obtained by imaging the object onto which the reference pattern is not projected.

11. The imaging system according to claim 1, wherein the first imaging device calculates the at least one of the shape information and the texture information of the object based on a taken image obtained by imaging by the first imager a first distance measuring pattern projected onto the object by the first projector.

12. The imaging system according to claim 1, wherein the first imaging device supplies information indicating a projection condition for the first projector to the second imaging device.

13. The imaging system according to claim 12, wherein the second imaging device further includes a second projector disposed in the second body and configured to project a second distance measuring pattern toward the object, wherein
the second imaging device calculates the at least one of the shape information and the texture information of the object based on a taken image obtained by imaging by the second imager the second distance measuring pattern projected onto the object by the second projector.

14. The imaging system according to claim 13, wherein
the projection condition includes timing of projection of the first projector, and
the second imaging device causes the second projector to perform projection at timing different from the first projector.

15. The imaging system according to claim 14, wherein
the first imaging device causes the first projector to project a first distance measuring pattern onto the object,
the first imaging device calculates the at least one of the shape information and the texture information of the object based on a taken image obtained by imaging by the first imager the object onto which the first distance measuring pattern is projected, and
the second imaging device causes the second projector to project the second distance measuring pattern in a period from when the first distance measuring pattern is projected until the reference pattern is projected.

16. An imaging system, comprising:
a first imaging device including
a first body; and
a first projector disposed in the first body;
the first imaging device configured to project a reference pattern indicating at least a part of first model information including at least one of shape information and texture information of an object toward the object; and
a second imaging device including:
a second body; and
a second imager including an image sensor and disposed in the second body;
the second imaging device configured to:
image the object onto which the reference pattern is projected;
calculate second model information including at least a part of shape information and texture information of the object based on an imaging result of the second imager; and extract the reference pattern projected by the first imaging device from the imaging result of the second imager.

17. The imaging system according to claim 16, wherein the first imaging device is further configured to transmit at least a part of the first model information to an information processing device comprising a processor.

18. An imaging device, comprising:
a body;
an imager including an image sensor, the imager disposed in the body and configured to image an object and a reference pattern projected onto the object;
the imaging device configured to:
  extract the reference pattern projected onto the object from an imaging result of the imager; and
  use the imaging result of the imager and the reference pattern to calculate first model information including at least one of shape information and texture information of the object, wherein
the reference pattern is (i) a pattern indicating at least a part of second model information that is different from the first model information calculated by the imaging device, and (ii) calculated by a remote device.

19. An imaging device, comprising:
a body;
an imager including an image sensor, the imager disposed in the body and configured to image a feature part provided on a surface of an object;
the imaging device configured to:
  extract the feature part of the object from an imaging result of the imager; and
  use the imaging result of the imager and the feature part to calculate first model information including at least one of shape information and texture information of the object, wherein
the feature part is (i) a feature indicating at least a part of second model information that is different from the calculated first model information, and (ii) calculated by a remote device.

20. The imaging device according to claim 19, wherein the feature part is a pattern including a feature point of the object.

21. The imaging device according to claim 19, wherein the feature part includes a pattern projected onto the object.

22. The imaging device according to claim 18, wherein the imaging device is further configured to generate integrated model information based on (i) the model information, (ii) the second model information including at least one of shape information and texture information obtained by imaging the object by the remote device that applies the reference pattern to the object, and (iii) the reference pattern.

23. The imaging device according to claim 22, wherein the imaging device is further configured to transmit the integrated model information that is generated based on a certain data format and is integrated by the imaging device.

24. The imaging device according to claim 18, wherein the reference pattern includes infrared light.

25. A method of imaging, comprising:
imaging an object by a first imager provided in a first body;
calculating first model information including at least one of shape information and texture information of the object based on an imaging result of the first imager by a first information calculator provided in the first body;
projecting a reference pattern indicating at least a part of the first model information calculated by the first information calculator toward the object;
imaging the object onto which the reference pattern is projected by a second imager provided in a second body;
calculating second model information including at least one of shape information and texture information of the object based on an imaging result of the second imager by a second information calculator provided in the second body; and
extracting the reference pattern projected by the first projector from the imaging result of the second imager.

26. A non-transitory computer readable storage medium storing therein a program that causes a computer to execute:
imaging a feature part provided on a surface of an object by an imager provided in a body;
extracting the feature part of the object from an imaging result of the imager; and
calculating first model information including at least one of shape information and texture information of the object by using the imaging result of the imager and the feature part by an information calculator provided in the body, wherein
the feature part (i) indicates at least a part of second model information that is different from the first model information, and (ii) is calculated by a remote device.

27. An imaging system, comprising:
an imaging device including:
  a body;
  an imager including an image sensor, the imager disposed in the body and configured to image an object; and
  a projector;
  the imaging device configured to:
    calculate model information including at least one of shape information and texture information of the object based on an imaging result of the imager;
    set a reference pattern indicating at least a part of the calculated model information; and
    project the reference pattern toward the object.

* * * * *